(12) United States Patent
Murao

(10) Patent No.: US 11,413,814 B2
(45) Date of Patent: Aug. 16, 2022

(54) METHOD OF MANUFACTURING PRODUCT AND ADDITIVE MANUFACTURING APPARATUS

(71) Applicant: CANON KABUSHIKI KAISHA, Tokyo (JP)

(72) Inventor: Hitoshi Murao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 16/782,548

(22) Filed: Feb. 5, 2020

(65) Prior Publication Data

US 2020/0262139 A1 Aug. 20, 2020

(30) Foreign Application Priority Data

Feb. 18, 2019 (JP) .............................. JP2019-026964

(51) Int. Cl.

| | |
|---|---|
| *B29C 64/153* | (2017.01) |
| *B29C 64/264* | (2017.01) |
| *B29C 64/218* | (2017.01) |
| *B29C 64/393* | (2017.01) |
| *B29C 64/245* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/153* (2017.08); *B29C 64/218* (2017.08); *B29C 64/245* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

2017/0282245 A1\* 10/2017 Yasuda .................. B22F 10/20

FOREIGN PATENT DOCUMENTS

JP 2007-100199 A 4/2007

\* cited by examiner

*Primary Examiner* — Alison L Hindenlang
*Assistant Examiner* — Asha A Thomas
(74) *Attorney, Agent, or Firm* — Venable LLP

(57) ABSTRACT

An additive manufacturing apparatus includes a base, a layer forming portion configured to form a powder layer having a predetermined thickness by moving in a space above the base, an irradiation portion configured to irradiate the powder layer with an energy beam, a detection portion configured to detect a projecting portion formed on a solidified portion and a position of the projecting portion, and a control unit. The solidified portion is formed by irradiating the powder layer with the energy beam from the irradiation portion. A height of the projecting portion is larger than the predetermined thickness. The layer forming portion includes a high-rigidity thickness-determining portion and a low-rigidity thickness-determining portion. The control unit is configured to control operation of the high-rigidity thickness-determining portion and the low-rigidity thickness-determining portion, depending on a detection result by the detection portion.

7 Claims, 14 Drawing Sheets

METHOD OF MANUFACTURING PRODUCT AND ADDITIVE MANUFACTURING APPARATUS

BACKGROUND OF THE INVENTION

Field of the Invention

The present invention relates to a method (additive manufacturing method) of manufacturing a product, such as a so-called powder depositing-and-melting method, that repeats formation and solidification of a powder layer, and to an additive manufacturing apparatus used for the method.

Description of the Related Art

In recent years, so-called 3D printers are being developed enthusiastically, and various methods are being tried for the development. For example, there are known methods such as fused deposition modeling, stereolithography that uses photo-curable resin, and powder depositing-and-melting method.

The powder depositing-and-melting method forms a three-dimensionally shaped object by repeating a process to spread material powder, made of nylon resin, ceramic, or metal, so as to form a layer of the powder, and a process to solidify a portion of the powder layer by selectively heating the portion by irradiating the portion with a laser beam, and by cooling the portion. In the powder depositing-and-melting method, metal powder is recently started to be used, as the material powder, for manufacturing products required to have high mechanical strength and good thermal conductivity.

In the powder depositing-and-melting method, however, when a desired portion of the powder layer is irradiated with a laser beam for melting or sintering the portion in accordance with a shape to be formed, a projecting solidified portion (projecting portion) that locally projects from the powder layer may be disadvantageously formed depending on a state of the deposited powder layer or the irradiation condition of the laser beam. In addition, the powder heated to a high temperature may fly like sparks and adhere to the surface of a solidified portion, forming a projecting solidified portion (projecting portion).

If the height of the projecting portion is larger than the thickness of a powder layer to be spread next, the projecting portion will interfere with a powder-layer forming mechanism when the powder-layer forming mechanism deposits the powder for the next layer and flattens the layer. In this case, the powder-layer forming mechanism may be caught on the projecting portion and prevented from moving, or otherwise a product on which the projecting portion is formed and which is being manufactured may be pushed down by the powder-layer forming mechanism. As a result, the manufacturing apparatus may stop, stopping the spreading of the powder layer.

As countermeasures to this problem, Japanese Patent Application Publication No. 2007-100199 discloses a method in which when the powder-layer forming mechanism contacts a projecting portion and receives force larger than a predetermined force, the powder-layer forming mechanism temporarily retracts toward a direction in which the powder-layer forming mechanism is separated from the projecting portion, while horizontally scanning the powder layer.

In the method of Japanese Patent Application Publication No. 2007-100199, when the powder-layer forming mechanism contacts a projecting portion, the powder-layer forming mechanism temporarily retracts from the projecting portion to a height at which the powder-layer forming mechanism does not contact the projecting portion, while moving horizontally. Thus, the manufacturing apparatus can be prevented from being stopped. However, in a period of time in which the powder-layer forming mechanism retracts upward while moving horizontally, the powder-layer forming mechanism cannot properly supply the material powder. For example, when the powder-layer forming mechanism is forming a powder layer while pushing a pile of powder by using a blade, if the powder-layer forming mechanism retracts the blade upward at a position at which a projecting portion is formed, the blade will move horizontally, with the pile of powder being left at the position. Even if the blade is then moved downward to a lower position after passing the projecting portion, the material powder is short at the position. Thus, the powder layer will not be formed after that even though the blade is moved horizontally, or otherwise the thickness of the powder layer will become thinner than a predetermined thickness.

In the manufacturing of products by using an additive manufacturing apparatus, there are single-product manufacturing and multiple-products manufacturing. The single-product manufacturing is used for manufacturing a single product in an area of the apparatus in which the product is manufactured, and the multiple-products manufacturing is used for simultaneously manufacturing multiple products in an area of the apparatus in which those products are manufactured.

In the single-product manufacturing, if a projecting portion is formed, a pile of powder will be left in the vicinity of the projecting portion, and a portion of a powder layer will have insufficient thickness. As a result, troubles will occur in the following manufacturing process, probably deteriorating the accuracy in shape of the manufactured object. In some cases, the manufactured object might have to be disposed.

In the multiple-products manufacturing, if a projecting portion is formed on one of products that are being manufactured, the other products that are being manufactured in parallel with the one product will not be properly supplied with the material powder to be used for forming the remaining portion of the layer. Specifically, a pile of powder will be left at positions at which the other products, which have been normally manufactured, are located; and a portion of the powder layer will have insufficient thickness. As a result, the manufacturing will not be able to be reliably continued. Thus, even when the multiple-products manufacturing is performed, the productivity will actually be lowered.

Thus, it has been desired to achieve a method in which even when a projecting portion is unintentionally formed while a product is being manufactured by repeating formation and solidification of a powder layer, the additive manufacturing of the product can be continued with high accuracy.

SUMMARY OF THE INVENTION

According to a first aspect of the present invention, a method of manufacturing a product includes a powder-layer forming step in which a layer forming portion moves in a space above a base and forms a powder layer having a predetermined thickness, a solidifying step in which the powder layer formed in the powder-layer forming step is irradiated with an energy beam in accordance with a shape of a product to be manufactured and a solidified portion is formed, and a check step in which whether a projecting portion is formed on the solidified portion formed in the solidifying step is checked, the projecting portion having a height larger than the predetermined thickness. The powder-layer forming step, the solidifying step, and the check step are repeated in this order. If the projecting portion is detected in the check step, the layer forming portion operates in the powder-layer forming step to be performed next, such that until reaching a position located in front of the projecting portion, the layer forming portion moves while forming the powder layer having the predetermined thickness by using a high-rigidity thickness-determining portion, at a position of the projecting portion, the layer forming portion moves while forming the powder layer by using a low-rigidity thickness-determining portion, and after passing the position of the projecting portion, the layer forming portion moves while forming the powder layer having the predetermined thickness by using the high-rigidity thickness-determining portion.

According to a second aspect of the present invention, an additive manufacturing apparatus includes a base, a layer forming portion configured to form a powder layer having a predetermined thickness by moving in a space above the base, an irradiation portion configured to irradiate the powder layer with an energy beam, a detection portion configured to detect a projecting portion formed on a solidified portion and a position of the projecting portion, the solidified portion being formed by irradiating the powder layer with the energy beam from the irradiation portion, a height of the projecting portion being larger than the predetermined thickness, and a control unit. The layer forming portion includes a high-rigidity thickness-determining portion and a low-rigidity thickness-determining portion. The control unit is configured to control operation of the high-rigidity thickness-determining portion and the low-rigidity thickness-determining portion, depending on a detection result by the detection portion.

Further features of the present invention will become apparent from the following description of exemplary embodiments with reference to the attached drawings.

DESCRIPTION OF THE EMBODIMENTS

Figure 1:
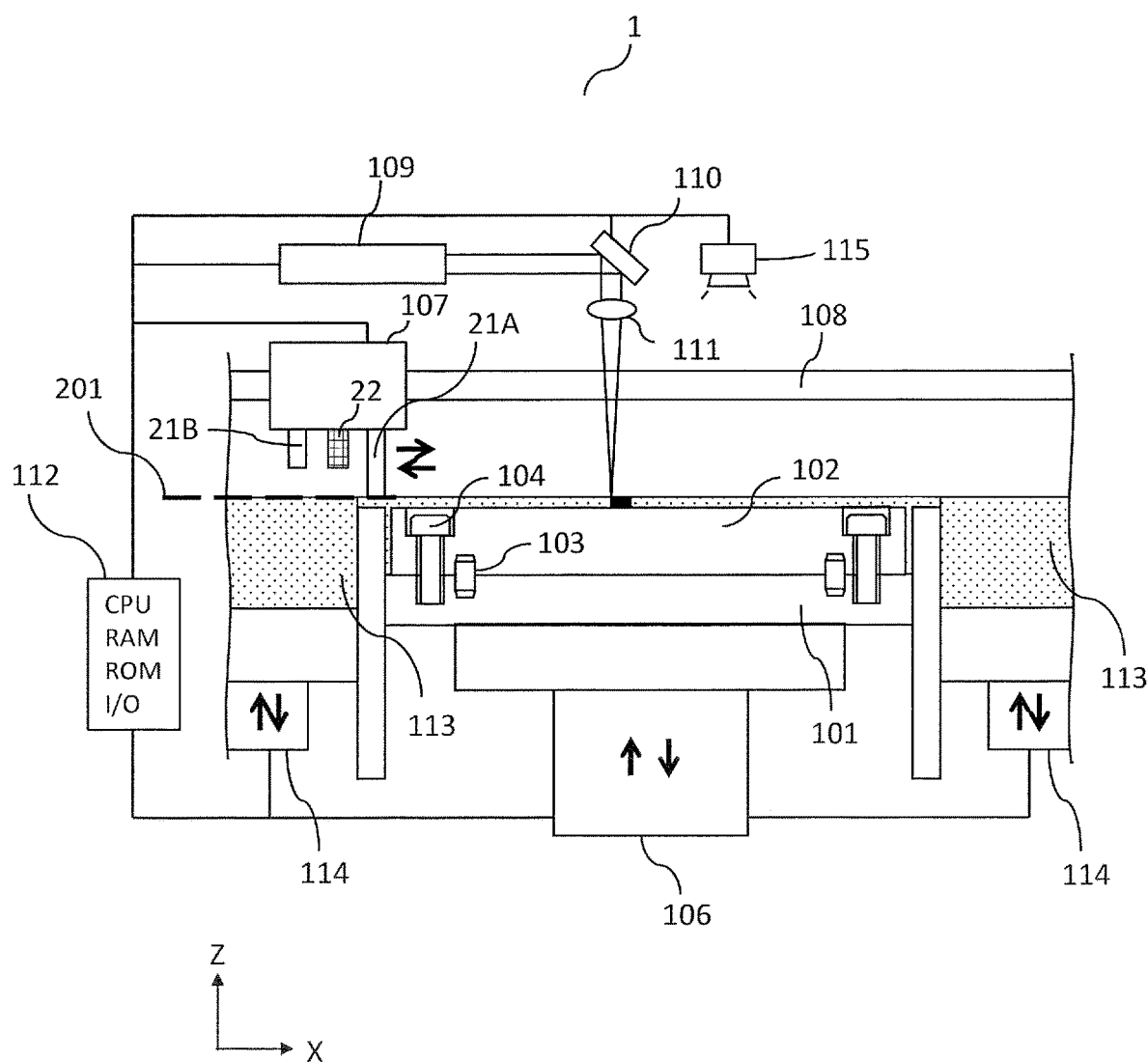
FIG. 1 is a cross-sectional view schematically illustrating an additive manufacturing apparatus of a first embodiment.

Hereinafter, a method of manufacturing a three-dimensionally shaped object and an additive manufacturing apparatus of an embodiment of the present invention will be described with reference to the accompanying drawings. Note that in the drawings referred to in the below-described embodiments and examples, a member denoted by an identical reference numeral has an identical function, unless otherwise specified. In addition, when a positional relationship or a direction is described in the description, a positive direction is a direction indicated by an arrow of a coordinate axis in the drawings, and a negative direction is a direction opposite to a direction indicated by an arrow of a coordinate axis in the drawings.

In the embodiments of the present invention, when a solidified portion is formed by heating a powder layer, the heated powder may sinter at a temperature lower than a melting point, or the powder may be heated to a temperature equal to or higher than the melting point, melted, and cooled and solidified. In addition, in the embodiments of the present invention in which one solidified portion is put on another for forming a three-dimensionally shaped object, there is a case in which an interface between two solidified portions can be identified in the observation of a cross section of the three-dimensionally shaped object. However, if the two solidified portions have been melted highly uniformly, the interface may not be clearly identified.

First Embodiment

Additive Manufacturing Apparatus

With reference to FIG. 1, an additive manufacturing apparatus 1 of a first embodiment will be described.

The additive manufacturing apparatus 1 includes a manufacturing table 101, to which a plate 102 can be attached. The plate 102 is a base used when a three-dimensionally shaped object is formed. The manufacturing table 101 includes a pin 103 that serves as a positional reference. The plate 102 is positioned by fitting the pin 103 in a pin hole of the plate 102. In the present embodiment, the plate 102 is fixed to the manufacturing table 101 via a screw 104. Note that the plate 102 may not be a plate-like member as long as it serves as the supporting base when a three-dimensionally shaped object is formed. In addition, the method of positioning the plate 102 with respect to the manufacturing table 101 is not limited to the above-described example. The manufacturing table 101 is supported by a vertical movement mechanism 106 so as to be able to move in a vertical direction (i.e. positive and negative directions in a Z-axis).

A powder storage portion 113 to store the material powder is disposed on the right and left sides with respect to the manufacturing table 101. The powder storage portion 113 supplies the material powder, which is used when a powder depositing apparatus 107 forms a powder layer on the plate 102. The powder storage portion 113 is supported by a powder-storage-portion vertical movement mechanism 114 so as to be able to move in the vertical direction (i.e. positive and negative directions in the Z-axis). A predetermined amount of material powder is lifted by moving the powder storage portion 113 by a predetermined distance toward the positive direction in the Z-axis, and the material powder is pushed by a high-rigidity plate-like member 21A, a high-rigidity plate-like member 21B, or a low-rigidity plate-like member 22, by moving the powder depositing apparatus 107 horizontally along an X-axis, so that a powder layer can be formed on the plate 102. As previously described, the positive direction is a direction indicated by an arrow of a coordinate axis in the drawings, and the negative direction is a direction opposite to a direction indicated by an arrow of a coordinate axis in the drawings. A deposition-height limiting line 201 indicated by a dotted line in FIG. 1 represents the height of the top surface of a powder layer to be formed by the powder depositing apparatus 107. Note that the powder storage portion 113 may not be disposed on both of the right and left sides with respect to the manufacturing table 101 as illustrated in FIG. 1. That is, the powder storage portion 113 may be disposed on either the right side or the left side with respect to the manufacturing table 101 if the powder storage portion 113 has a capacity capable of storing a predetermined amount of powder.

Above the manufacturing table 101, the powder depositing apparatus 107 and a movement guide 108 are disposed. The powder depositing apparatus 107 is an apparatus to deposit the material powder so as to form a powder layer having a predetermined thickness, and is supported by the movement guide 108 so as to move back and forth horizontally along the X-axis, so that the powder depositing apparatus 107 can move in a space above the plate 102 (or can scan the plate 102).

Figure 2:
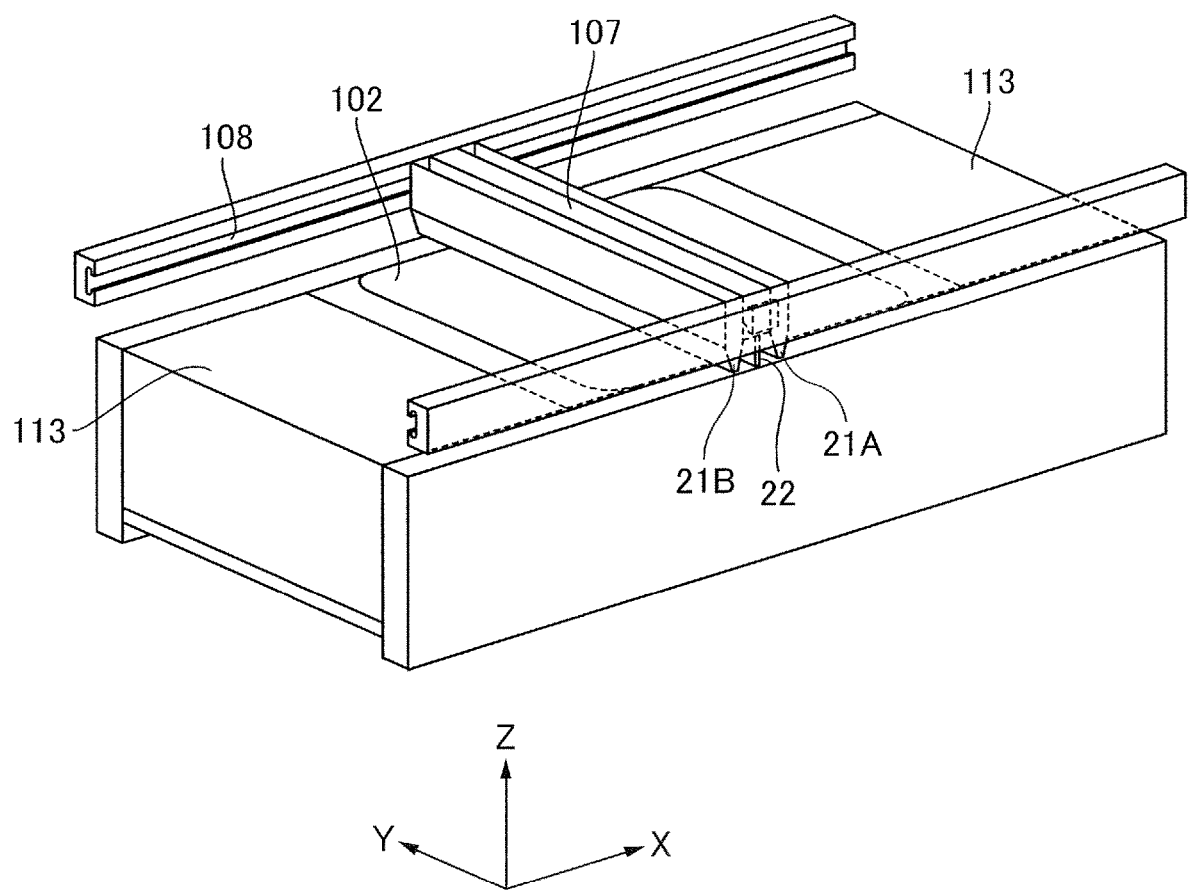
FIG. 2 is a perspective view schematically illustrating a powder depositing apparatus and its surroundings of the first embodiment.
Figure 3:
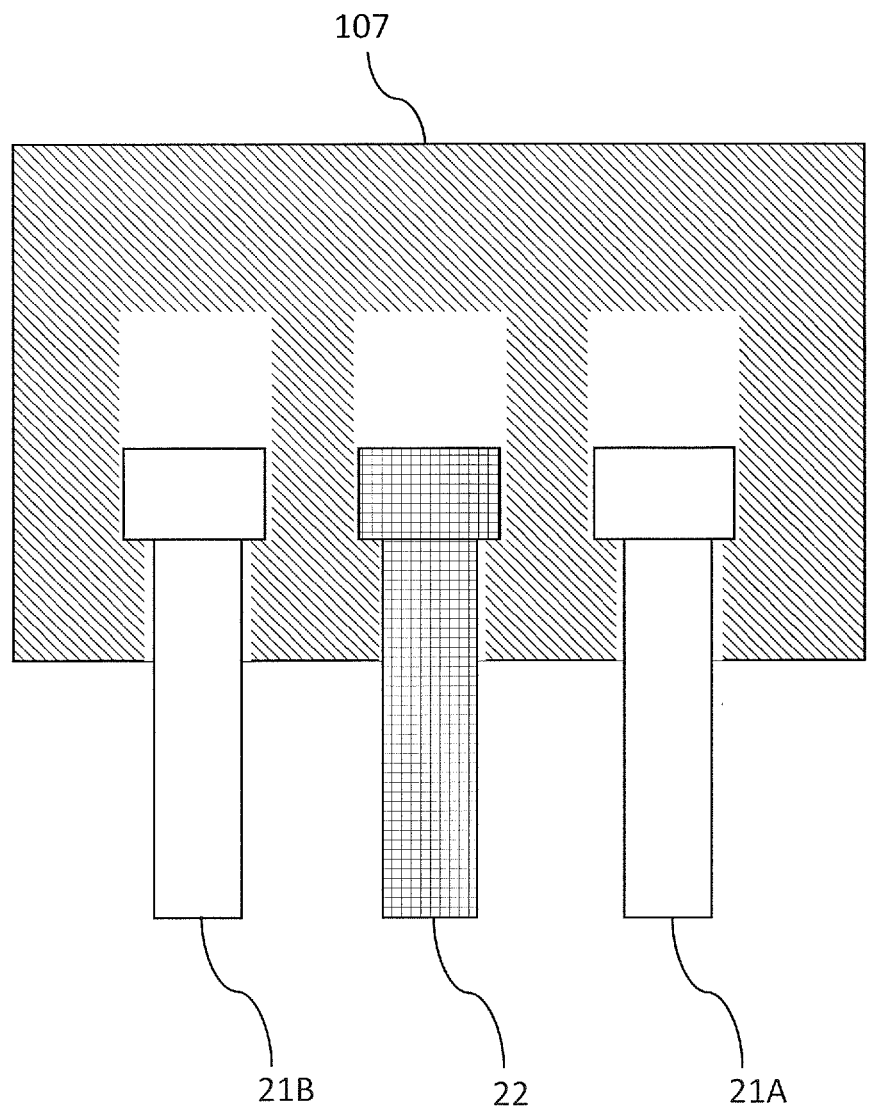
FIG. 3 is a partial cross-sectional view schematically illustrating a structure of the powder depositing apparatus of the first embodiment.

FIG. 2 is a perspective view schematically illustrating the powder depositing apparatus 107 and its surroundings of the present embodiment. FIG. 3 is a partial cross-sectional view schematically illustrating a structure of the powder depositing apparatus 107 of the present embodiment.

As illustrated in FIG. 3, the powder depositing apparatus 107 includes the high-rigidity plate-like member 21A, the high-rigidity plate-like member 21B, and the low-rigidity plate-like member 22 whose rigidity is smaller than that of the high-rigidity plate-like members 21A and 21B. In the following description, when a common description is made for both of the high-rigidity plate-like members 21A and 21B, a reference numeral 21 may be given to the high-rigidity plate-like members, and the high-rigidity plate-like members may be referred to as a high-rigidity plate-like member 21.

Each of the three plate-like members is a blade that pushes a pile of material powder toward a direction extending along the X-axis and forms a powder layer having a flat top surface and a constant thickness. Since the position of the lower edge of the blade determines the thickness of a powder layer to be formed, the high-rigidity plate-like member 21 and the low-rigidity plate-like member 22 are thickness determining portions that determine the thickness of the powder layer. The low-rigidity plate-like member 22 is easily deformed compared to the high-rigidity plate-like member 21. Thus, it is not preferable that the low-rigidity plate-like member 22 is used throughout the formation of a powder layer.

As described in detail later, the high-rigidity plate-like member 21 is used in a powder-layer forming process performed for an area in which no projecting portion is formed, and the low-rigidity plate-like member 22 is used in a powder-layer forming process performed immediately after a projecting portion is formed. Specifically, the low-rigidity plate-like member 22 is used, in the powder-layer forming process, for forming a portion of the powder layer in the vicinity of the projecting portion.

Since the high-rigidity plate-like member 21 slides on the material powder for a long time, it is preferable that coating process is performed in advance on the surface of the high-rigidity plate-like member 21 for increasing wear resistance. For example, it is effective that the surface of the high-rigidity plate-like member 21 is coated with diamond-like carbon (DLC), which is used for tools of machine tools and injection molding molds, or is treated through nitriding or high-frequency induction hardening.

For ensuring flatness of the powder layer, the high-rigidity plate-like member 21 is made of material that is hardly deformed even when force is applied to the high-rigidity plate-like member 21 in a state where the high-rigidity plate-like member 21 is pushing the material powder. That is, hard material such as metal is suitable for the high-rigidity plate-like member 21. For example, high-rigidity material such as SKD11, SUS420J2, or tungsten carbide is suitably used for the high-rigidity plate-like member 21. Thus, since the high-rigidity plate-like member 21 has high strength, the high-rigidity plate-like member 21 hardly deforms even when colliding with a projecting portion formed on a three-dimensionally shaped object. In this case, the driving apparatus would stop due to the resistance of the high-rigidity plate-like member 21, or otherwise the three-dimensionally shaped object would collapse.

In the present embodiment, however, as illustrated in FIG. 3, the high-rigidity plate-like member 21 is supported by the powder depositing apparatus 107 so as to be able to move up and down, so that the high-rigidity plate-like member 21 can retract toward the positive direction in the Z-axis when a projecting portion is formed on the three-dimensionally shaped object during the manufacturing of the object. The mechanism to move up and down the high-rigidity plate-like member 21 may be any mechanism as long as the mechanism is housed in the powder depositing apparatus 107 and can move up and down the high-rigidity plate-like member 21. For example, the mechanism may be a piston mechanism that controls the high-rigidity plate-like member 21 by using air pressure or oil pressure, or a mechanism that uses a rack and a pinion and converts the rotary motion of a component, such as a motor, to the linear motion. In addition, although the high-rigidity plate-like member 21 moves vertically, in the present embodiment, to retract when a projecting portion is formed on an object, the method of retracting the high-rigidity plate-like member 21 is not limited to this. For example, the high-rigidity plate-like member 21 may be retracted by a rotation mechanism or an expansion-and-contraction mechanism.

Figure 7A:
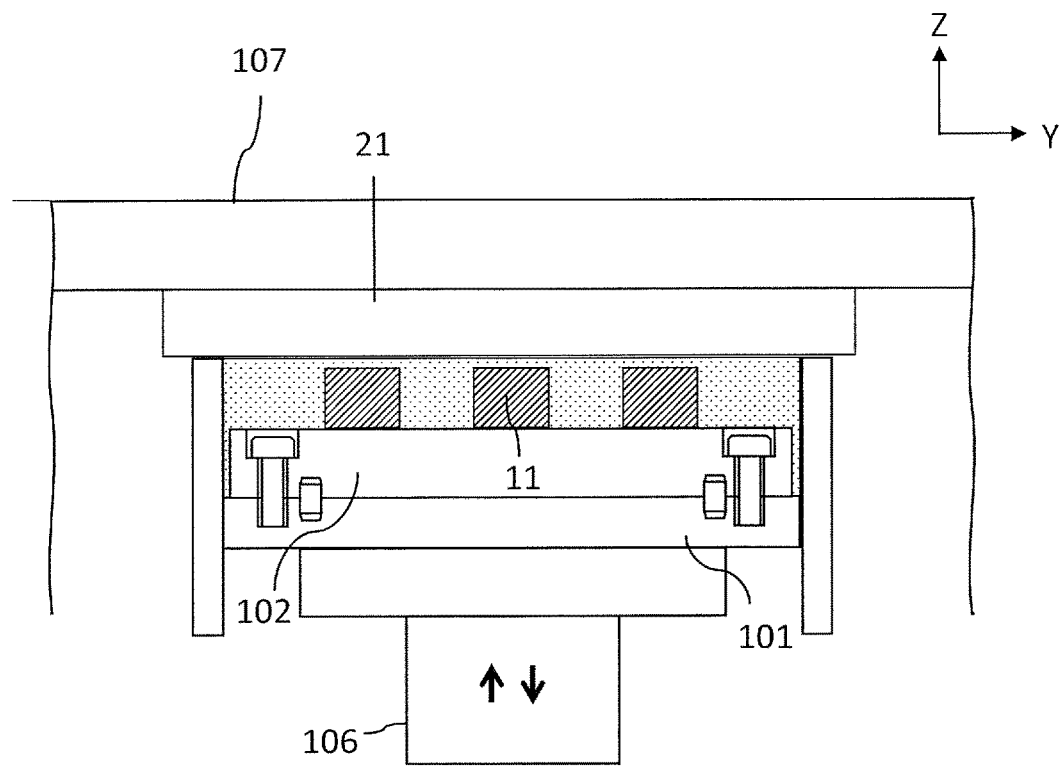
FIG. 7A is a diagram illustrating a state in which a projection portion is not formed.

FIG. 7A illustrates the powder depositing apparatus 107 as seen from a direction perpendicular to FIG. 3, in a state where a projecting portion 12 is not formed. The high-rigidity plate-like member 21 (that is, each of the high-rigidity plate-like members 21A and 21B) of the present embodiment is a single plate having a predetermined width so as to be able to spread the powder in the whole width, in a Y direction, of an area in which a three-dimensionally shaped object is formed.

Note that not only the above-described high-rigidity plate-like member 21 but also another member, such as a high-rigidity roller, other than the plate-like member may be used as the thickness determining portion, for forming a flat powder layer having a predetermined thickness. Also in this case, the supporting mechanism is disposed for allowing the other member to retract when a projecting portion is formed on a three-dimensionally shaped object.

The low-rigidity plate-like member 22 is normally retracted and positioned at a position at which the low-rigidity plate-like member 22 does not contact the powder. However, if a projecting portion larger than a thickness of a powder layer to be spread next is unintentionally formed, the low-rigidity plate-like member 22 is used for forming a portion of the powder layer in the vicinity of the projecting portion, in the powder-layer forming process performed immediately after the projecting portion is formed. The low-rigidity plate-like member 22 is a member made of a material, such as an elastic material, that allows a contact portion of the low-rigidity plate-like member 22 to bend and deform in accordance with the shape of the projecting portion when contacting the projecting portion. Specifically, the low-rigidity plate-like member 22 is made of a low-rigidity material containing a main component such as silicone rubber or elastomer.

As illustrated in FIG. 3, the low-rigidity plate-like member 22 is supported by the powder depositing apparatus 107 so as to be able to move up and down, so that the low-rigidity plate-like member 22 can perform the layer forming process in the vicinity of a projecting portion in place of the high-rigidity plate-like member 21 when the projecting portion is formed on a three-dimensionally shaped object during the manufacturing of the object. The mechanism to move up and down the low-rigidity plate-like member 22 may be any mechanism as long as the mechanism is housed in the powder depositing apparatus 107 and can move up and down the low-rigidity plate-like member 22. For example, the mechanism may be a piston mechanism that controls the low-rigidity plate-like member 22 by using air pressure or oil pressure, or a mechanism that uses a rack and a pinion and converts the rotary motion of a component, such as a motor, to the linear motion. In the present embodiment, when a projecting portion is formed on an object, the low-rigidity plate-like member 22 moves toward the negative direction in the Z-axis and takes a posture for forming the layer. Note that the method of moving the low-rigidity plate-like member 22 for causing the low-rigidity plate-like member 22 to take a posture for forming the layer is not limited to this. For example, the low-rigidity plate-like member 22 may be moved by a rotation mechanism or an expansion-and-contraction mechanism.

Figure 7B:
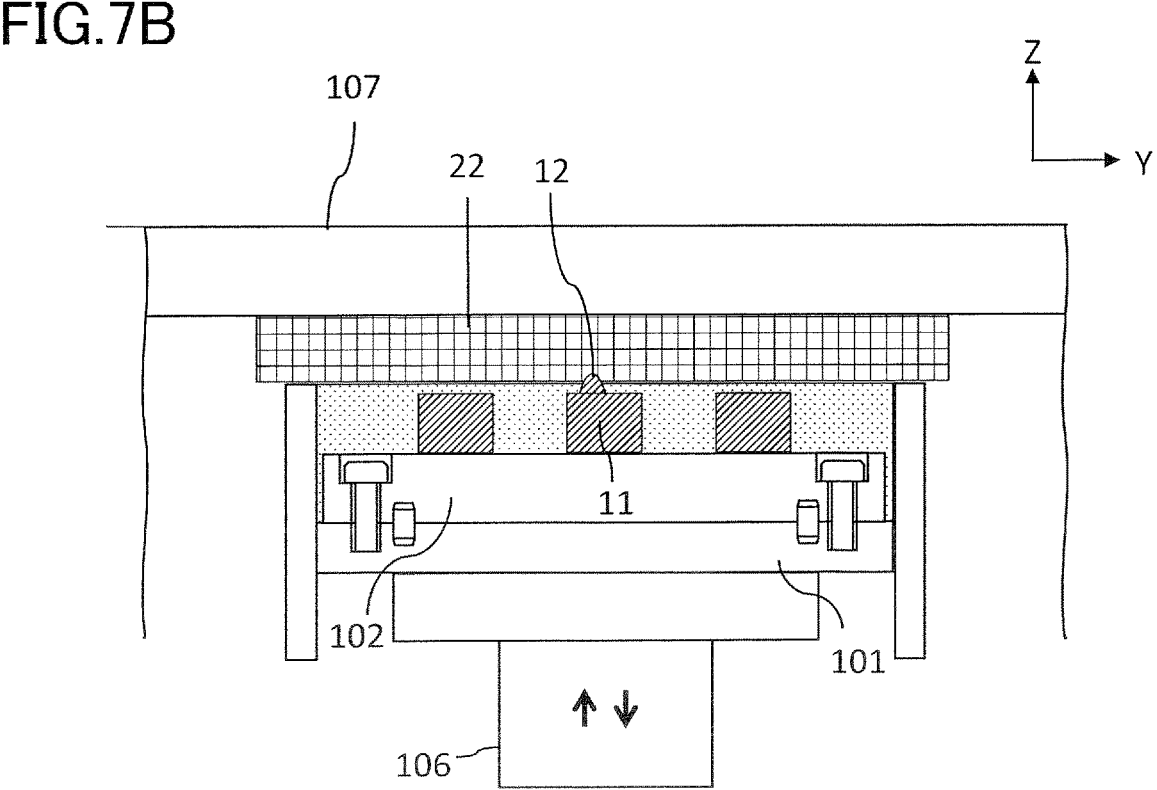
FIG. 7B is a diagram illustrating a state in which the high-rigidity plate-like member is moved while retracted, and in which the low-rigidity plate-like member spreads the powder.

FIG. 7B illustrates the powder depositing apparatus 107 as seen from a direction perpendicular to FIG. 3, in a state where the powder depositing apparatus 107 is forming a portion of a layer in which the projecting portion 12 is formed. The low-rigidity plate-like member 22 of the present embodiment is a single plate having a predetermined width so as to be able to spread the powder in the whole width, in the Y direction, of an area in which a three-dimensionally shaped object is formed. Since the low-rigidity plate-like member 22 deforms in accordance with the shape of the projecting portion at a position at which the low-rigidity plate-like member 22 contacts the projecting portion, the low-rigidity plate-like member 22 can spread the powder in the whole width in the Y direction, without forming any gap.

Note that not only the above-described low-rigidity plate-like member 22 but also another member, such as a low-rigidity roller or a brush, other than the plate-like member may be used as the thickness determining portion, for forming a flat powder layer having a predetermined thickness. Also in this case, the supporting mechanism is disposed for allowing the other member to retract in a normal condition and take a posture for forming the layer when a projecting portion is formed on a three-dimensionally shaped object.

In the present embodiment, as illustrated in FIG. 3, the high-rigidity plate-like members 21A and 21B are arranged so as to sandwich the low-rigidity plate-like member 22 in the moving direction (positive or negative direction in the X-axis) of the powder depositing apparatus 107. Since the powder depositing apparatus 107 includes the two high-rigidity plate-like members 21A and 21B, the powder depositing apparatus 107 may not have to move toward a direction opposite to a direction in which the powder depositing apparatus 107 normally moves. However, the arrangement and the number of the high-rigidity plate-like members may be changed as appropriate in accordance with a scanning method. For example, as in a later-described second embodiment, a single high-rigidity plate-like member may be disposed on only one side of the low-rigidity plate-like member 22.

Referring back to FIG. 1, a laser light source 109, a scanner 110, and a condensing lens 111, which constitute an irradiation portion that emits an energy beam, are disposed above the manufacturing table 101.

The laser light source 109, the scanner 110, and the condensing lens 111 are an irradiation optical system that selectively irradiates a focal point, located on the material powder layer spread on the plate 102 by the powder depositing apparatus 107, with a heating laser beam in accordance with the shape of an object to be manufactured.

Above the manufacturing table 101, a monitoring device 115 is disposed for monitoring the state of the powder layer formed on the plate 102 and measuring the shape of a solidified portion formed after the laser irradiation. The monitoring device 115 includes an image capturing device, for example. The monitoring device 115 processes a captured image, and thereby can determine whether a projecting portion is formed, and detect the position of the projecting portion if the projecting portion is formed. The monitoring device 115 may have any system as long as the system can measure the shape of a solidified portion above the plate 102 and detect a projecting portion. For example, an image capturing device that can capture a moving image and/or a still image or a length measuring apparatus that uses a laser beam may be used as a detection portion. In addition, the shape and the position of a projecting portion may be detected by using a contact-type displacement sensor or pressure sensor. The system and the installation position of the monitoring device 115, and the number of the devices (in a case where a plurality of monitoring devices 115 is used) may be appropriately selected so that the whole area in which a three-dimensionally shaped object is formed can be measured with a required accuracy and that the detection result can be outputted to a control unit 112.

The control unit 112 of the additive manufacturing apparatus 1 is a computer that controls operation of each unit of the additive manufacturing apparatus 1, and contains a CPU, a ROM, a RAM, and an I/O port.

The ROM is a computer-readable storage medium, and stores a program used for operating the additive manufacturing apparatus 1. For example, the control unit 112 executes the program for performing the powder-layer forming process, in which the powder depositing apparatus 107, which serves as a layer forming portion that forms a powder layer, moves in a space above the base and forms a powder layer having a predetermined thickness. In another case, the control unit 112 executes the program for performing the solidifying process, in which the powder layer is irradiated with the energy beam in accordance with the shape of a plurality of products for forming a solidified portion.

The I/O port is connected to an external device or a network. For example, the data necessary for the additive manufacturing is sent from the external device to the additive manufacturing apparatus 1 and vice versa, via the I/O port. The data necessary for the additive manufacturing includes data on the shape of a three-dimensionally shaped object to be formed, information data on the material to be used for the additive manufacturing, and layer shape data for each layer. The layer shape data is slice data. The slice data may be sent from an external computer, or may be created by the CPU of the control unit 112 in accordance with the data on the shape of the object, and stored in the RAM.

The control unit 112 is connected with components, such as the vertical movement mechanism 106 for the manufacturing table 101, the powder depositing apparatus 107, the laser light source 109, the scanner 110, the condensing lens 111, and the powder-storage-portion vertical movement mechanism 114; and controls the operation of these components for performing processes of the additive manufacturing.

In addition, the control unit 112 analyzes an image of a three-dimensionally shaped object formed after the laser irradiation and captured by the monitoring device 115, and determines whether a projecting portion is formed, and performs a detection process (check process) that detects the position of the projecting portion if the projecting portion is formed.

Method of Manufacturing Three-Dimensionally Shaped Object

First, a basic manufacturing operation of the additive manufacturing apparatus 1 will be described, and then an operation of the additive manufacturing apparatus 1 performed when a projecting portion is unintentionally formed will be described.

After the plate 102 is attached to the manufacturing table 101 of the additive manufacturing apparatus 1, the additive manufacturing apparatus 1 repeatedly deposits one solidified portion on another for forming a plurality of three-dimensionally shaped and spaced objects on the plate 102.

Figure 13:
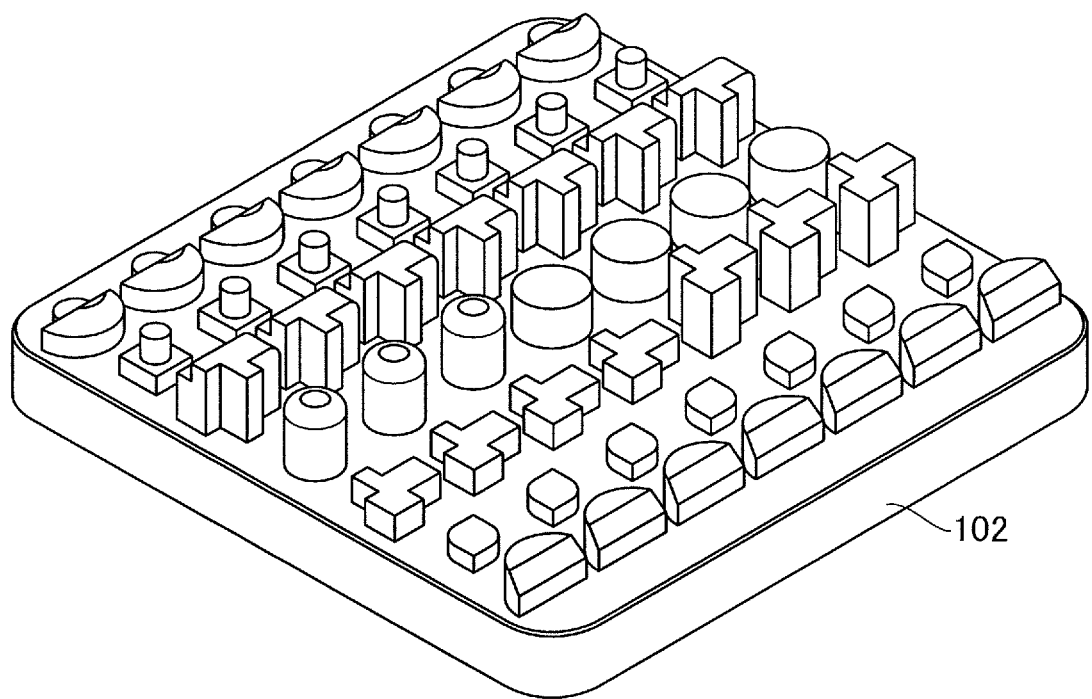
FIG. 13 is a perspective view illustrating a plurality of three-dimensionally shaped objects formed on a plate.
Figure 13:
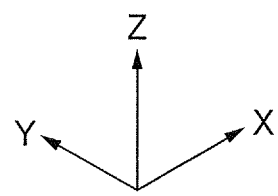
Figure 14:
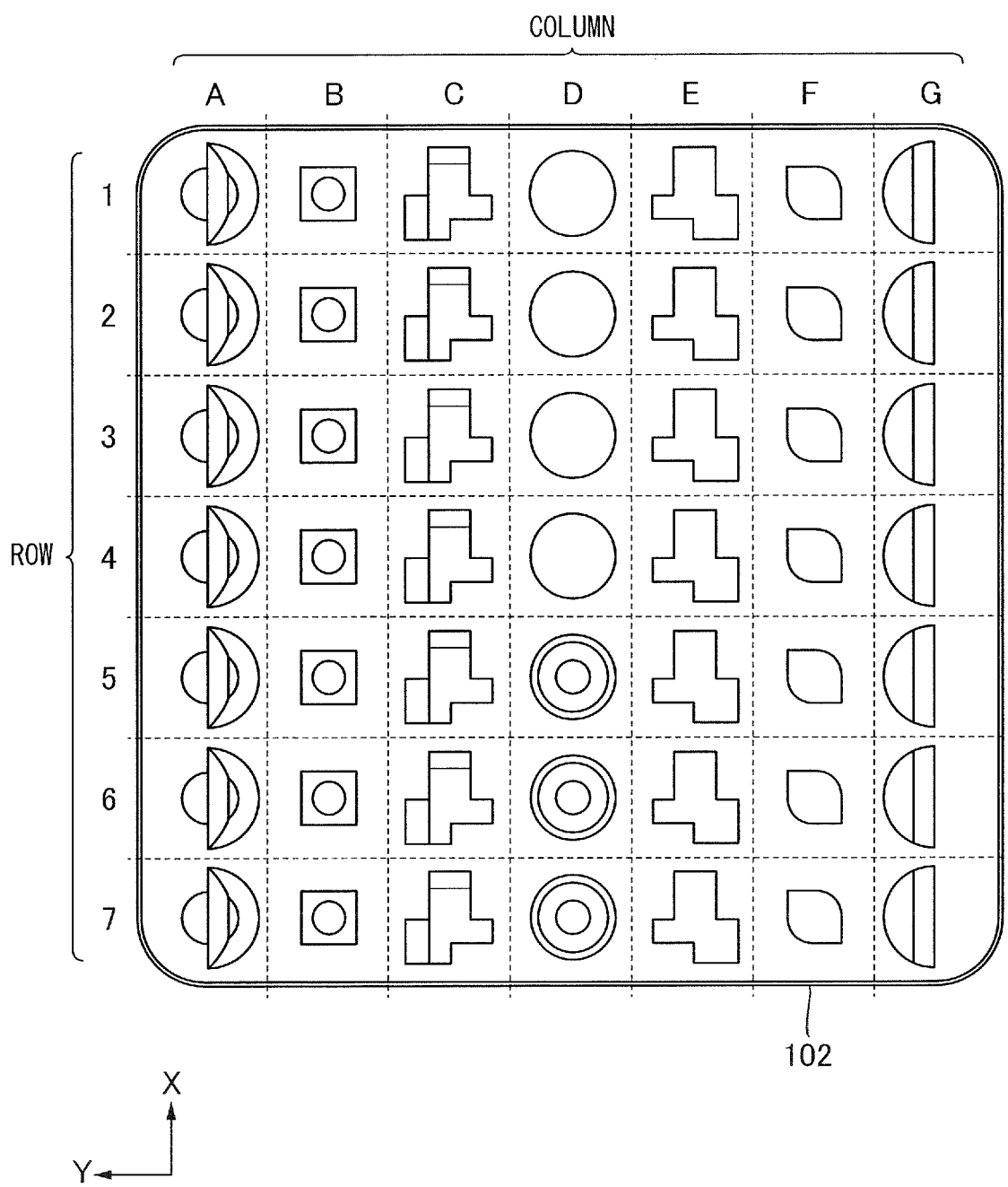
FIG. 14 is a plan view illustrating the plurality of three-dimensionally shaped objects formed on the plate.

As one example, the description will be made for a case where 9 varieties of 49 objects are formed, separated from each other, on the plate 102 in seven rows and seven columns, as illustrated in the perspective view of FIG. 13 and the plan view of FIG. 14. Since the above-describe case is one example, the shape, the number, and the arrangement of three-dimensionally shaped objects are not limited to the above-described case in the present embodiment.

The control unit 112 first performs a powder-layer forming process to form a powder layer having a predetermined thickness. Specifically, the control unit 112 sends a command to the vertical movement mechanism 106 and causes the manufacturing table 101 to move to an initial position for performing the manufacturing operation. Then, the control unit 112 causes the powder-storage-portion vertical movement mechanism 114 to lift the right or the left portion of the powder storage portion 113 for lifting the powder to a position higher than the deposition-height limiting line 201.

Then the control unit 112 sends a command to the powder depositing apparatus 107 and causes the powder depositing apparatus 107 to move along the movement guide 108 from the lifted powder storage portion 113 side toward the plate 102 in the positive or the negative direction in the X-axis. In this time, the high-rigidity plate-like member 21A is positioned such that the height of the lower edge of the high-rigidity plate-like member 21A is made equal to the height of the deposition-height limiting line 201 in the Z-axis. On the other hand, the low-rigidity plate-like member 22 and the other high-rigidity plate-like member 21B are retracted and positioned at positions at which the low-rigidity plate-like member 22 and the high-rigidity plate-like member 21B do not contact the powder. The high-rigidity plate-like member 21A moves in a space above the plate 102 while pushing the powder located above the deposition-height limiting line 201, so that the first layer of material powder having a predetermined thickness is formed on the plate 102.

After forming the first layer of material powder, the control unit 112 performs a solidifying process. That is, the control unit 112 sends commands to the laser light source 109, the scanner 110, and the condensing lens 111, and causes them to irradiate a target portion of the material powder (to be solidified) with a laser beam for heating the portion. The scanner 110 causes the laser beam emitted from the laser light source 109 to freely scan the powder material in the X and Y directions. The laser beam is focused on a very small portion of the powder layer by the condensing lens 111, and the locally heated portion of the powder layer is sintered or melted. The locally heated portion is then cooled and solidified. Thus, the laser light source 109 is turned on and off while the powder layer is scanned by the laser beam via the scanner 110. In this manner, a desired portion of the powder layer is irradiated with the laser beam, and a solidified portion is formed. The control unit 112 performs the solidifying process in accordance with a shape pattern of the solidified portion to be formed in the first layer.

After completing the solidifying process in which a predetermined portion of the first layer of the material powder is solidified for the 49 objects, the control unit 112 sends a command to the vertical movement mechanism 106 and causes the vertical movement mechanism 106 to lower the manufacturing table 101 by the thickness of one layer. Then the control unit 112 sends commands to the powder depositing apparatus 107 and the powder-storage-portion vertical movement mechanism 114 and causes them to deposit the second layer of material powder on the first layer of material powder, for which the solidifying process has been completed. That is, the control unit 112 performs the powder-layer forming process for the second layer.

Then, the control unit 112 sends commands to the laser light source 109, the scanner 110, and the condensing lens 111, and causes them to irradiate a target portion of the material powder with a laser beam in accordance with a shape pattern for the second layer, for forming a solidified portion of the second layer. After that, the control unit 112 deposits one solidified portion on another by repeating the powder-layer forming process and the solidifying process, and continues the additive manufacturing until a product with desired shape is completed.

After completing a solidifying process for each layer and before starting a powder-layer forming process for the next layer, the control unit 112 analyzes an image (captured by the monitoring device 115) of the three-dimensionally shaped object for which a corresponding solidifying process has been completed, and determines whether a projecting portion is formed. Specifically, the projecting portion determined by the control unit 112 is a portion projecting from the deposition-height limiting line 201 after the vertical movement mechanism 106 lowers the manufacturing table 101 by the thickness of one layer for forming the next layer. If such a projecting portion is detected, the control unit 112 stores the data on the position of the projecting portion, that is, the data on the X and Y coordinates of the projecting portion.
Operation Performed when Projecting Portion is Formed When a projecting portion (projecting solidified portion) that projects from the deposition-height limiting line 201 is detected, the control unit 112 performs the powder-layer forming process for the next layer, in a manufacturing operation different from the above-described basic manufacturing operation. The operation of the additive manufacturing apparatus 1 will be described with reference to FIGS. 4A and 4B, FIGS. 5A and 5B, and FIG. 6. Note that in these figures, part of the three-dimensionally shaped objects formed in seven rows and seven columns is omitted for convenience of illustration.

Figure 4A:
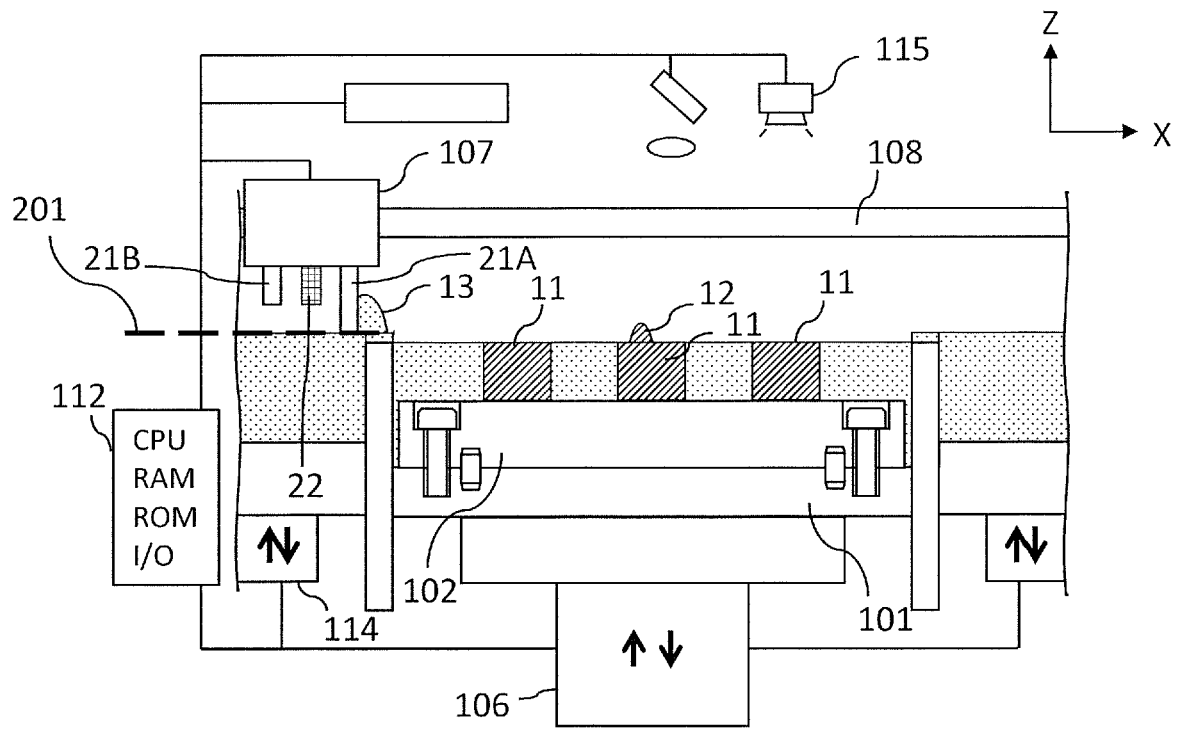
FIG. 4A is a diagram schematically illustrating a state in which a projecting portion is formed in the first embodiment.

FIG. 4A schematically illustrates a state in which a projecting portion that projects from the deposition-height limiting line 201 is formed after the powder-layer forming process and the solidifying process have been repeated several times. FIG. 4A illustrates a solidified portion 11 and an unintentionally formed projecting portion 12. The solidified portion 11 is a three-dimensionally shaped object that is being formed, that is, a portion in which the material powder has been solidified. In this case, the projecting portion 12 is formed, for example, when a three-dimensionally shaped cylindrical object located at the fourth row and the D-th column in FIG. 14 is being formed. The control unit 112 stores the data on the position of the projecting portion 12, that is, the data on the X and Y coordinates of the projecting portion 12, and the data on the height of the projecting portion 12 in the Z-direction, obtained by analyzing an image captured by the monitoring device 115.

Then, as the preparation for depositing the powder for the next layer, the control unit 112 sends a command to the vertical movement mechanism 106 and causes the vertical movement mechanism 106 to lower the manufacturing table 101 by the thickness of one layer, as in the above-described basic operation. The control unit 112 then sends commands to the powder depositing apparatus 107 and the powder-storage-portion vertical movement mechanism 114 and forms a pile of powder 13 in front of the high-rigidity plate-like member 21A so that the high-rigidity plate-like member 21A pushes and supplies the powder onto the plate 102.

Figure 4B:
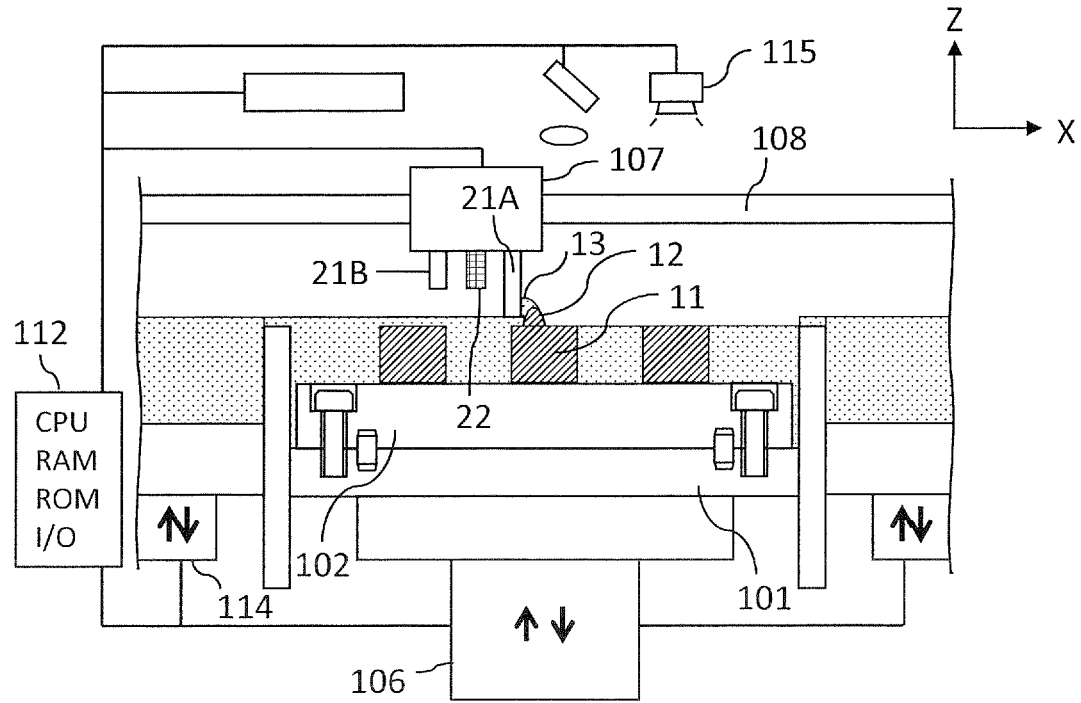
FIG. 4B is a diagram illustrating an operation of the powder depositing apparatus in the first embodiment, in which a high-rigidity plate-like member spreads a powder layer to a position that the high-rigidity plate-like member reaches immediately before reaching the projecting portion.

Then, as illustrated in FIG. 4B, the control unit 112 causes the powder depositing apparatus 107 to move toward the right direction in FIG. 4B (i.e. positive direction in the X-axis) while pushing the pile of powder 13, for spreading the powder layer such that the top surface of the powder layer becomes flat. Since the data on the position of the projecting portion is stored in the control unit 112, the control unit 112 controls the operation of the powder depositing apparatus 107 so that the high-rigidity plate-like member 21A spreads the powder layer to a position that the high-rigidity plate-like member 21A reaches immediately before reaching the projecting portion. Thus, in the case where a projecting portion is formed on the three-dimensionally shaped cylindrical object located at the fourth row and the D-th column in FIG. 14, the high-rigidity plate-like member 21A spreads the powder as usual on other three-dimensionally shaped objects located in the seventh to the fifth rows, which are located upstream in the moving direction.

When the high-rigidity plate-like member 21A moves to the position that the high-rigidity plate-like member 21A reaches immediately before reaching the projecting portion 12, the control unit 112 sends a command to the powder depositing apparatus 107 and causes the powder depositing apparatus 107 to move the high-rigidity plate-like member 21A toward the positive direction in the Z-axis, to a height at which the high-rigidity plate-like member 21A does not contact the projecting portion 12.

Figure 5A:
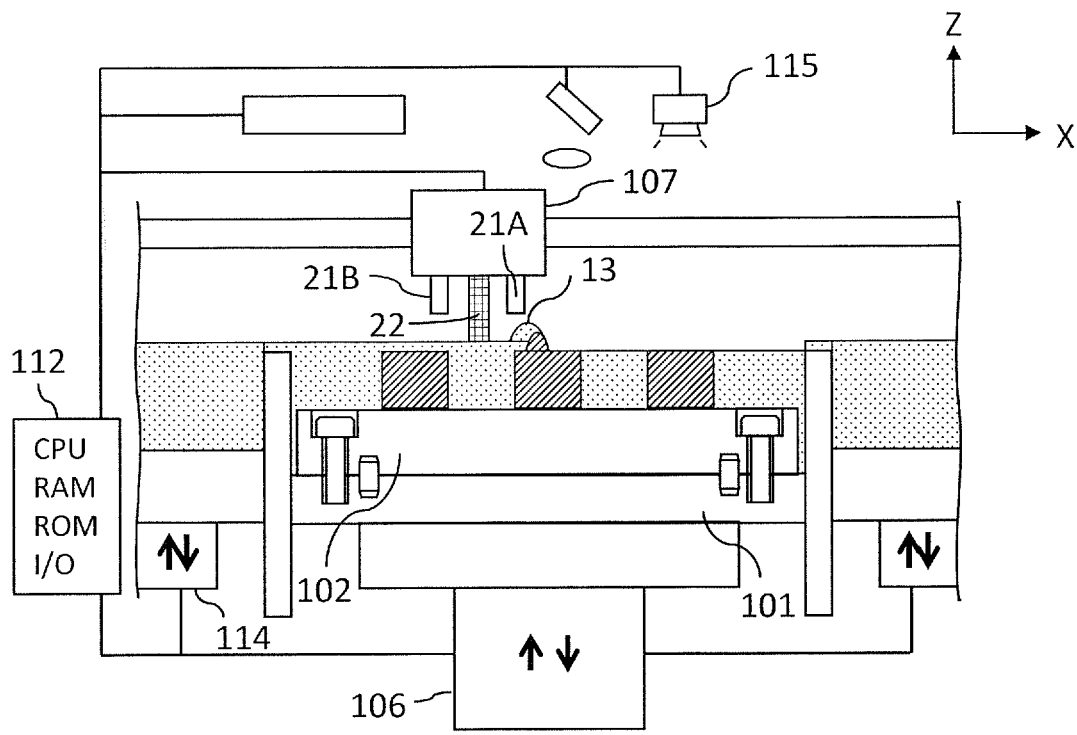
FIG. 5A is a diagram illustrating a state of the powder depositing apparatus in the first embodiment, in which the high-rigidity plate-like member is retracted upward and a low-rigidity plate-like member is moved to a powder-layer formation height.

Then, as illustrated in FIG. 5A, in the state where the control unit 112 causes the high-rigidity plate-like member 21A to retract upward and take a posture in which the high-rigidity plate-like member 21A does not contact the projecting portion 12, the control unit 112 causes the low-rigidity plate-like member 22 to move toward the negative direction in the Z-axis so that the height of the lower edge of the low-rigidity plate-like member 22 is made equal to the height of the deposition-height limiting line 201.

Figure 5B:
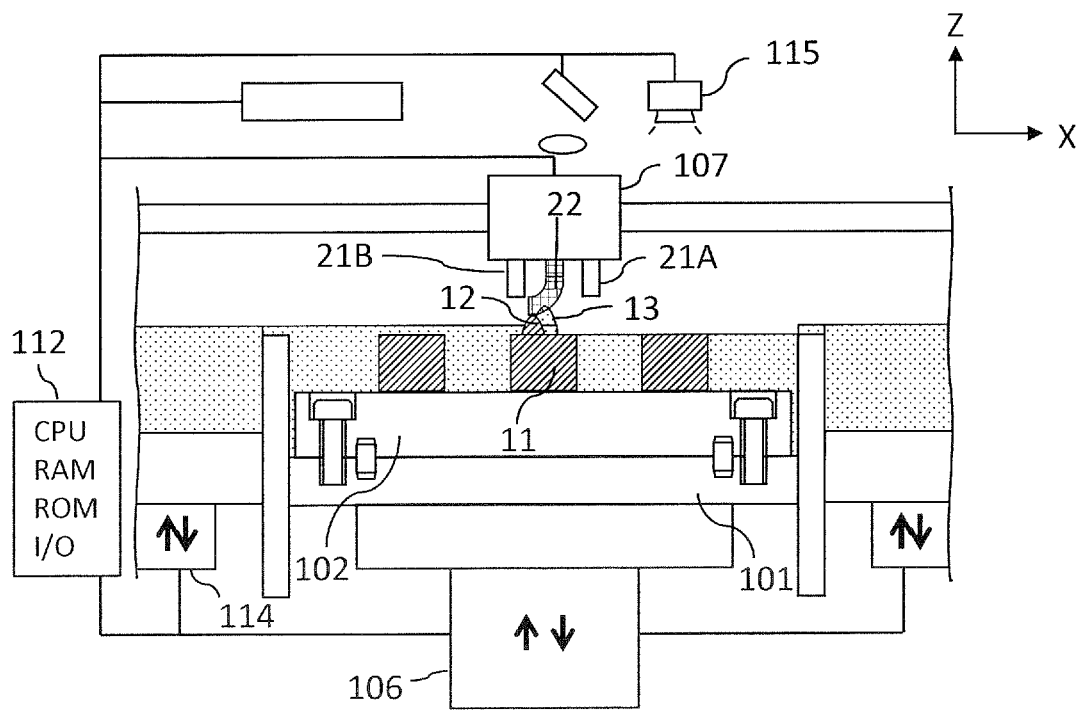
FIG. 5B is a diagram illustrating a state of the powder depositing apparatus in the first embodiment, in which the low-rigidity plate-like member is moving the position of the projecting portion.

Then, as illustrated in FIG. 5B, the control unit 112 causes the powder depositing apparatus 107 to move toward the positive direction in the X-axis. Since the high-rigidity plate-like member 21A passes through a space above the projecting portion 12 without contacting the projecting portion 12, the powder depositing apparatus 107 does not stop, and the high-rigidity plate-like member 21A does not cause the collapse of the three-dimensionally shaped object 11, on which the projecting portion 12 is formed and which is located at the fourth row and the D-th column. In this time, since the low-rigidity plate-like member 22 deforms in accordance with the shape of the projecting portion 12, as illustrated in FIG. 7B, at a position at which the low-rigidity plate-like member 22 contacts the projecting portion 12, the low-rigidity plate-like member 22 can spread the powder in the whole width in the Y direction, without forming any gap. That is, the low-rigidity plate-like member 22 can spread the powder layer having a predetermined thickness not only on the object, which is located at the fourth row and the D-th column and on which the projecting portion 12 is formed, but also on other objects located in the fourth row and in columns other than the D-th column.

When the low-rigidity plate-like member 22 moves toward the positive direction in the X-axis, to a position separated from the projecting portion 12, the control unit 112 sends a command to the powder depositing apparatus 107 and causes the powder depositing apparatus 107 to retract the low-rigidity plate-like member 22 toward the positive direction in the Z-axis, to a height at which the low-rigidity plate-like member 22 does not contact the projecting portion 12. In addition, the control unit 112 causes the powder depositing apparatus 107 to move toward the positive direction in the X-axis so that the other high-rigidity plate-like member 21B is positioned in front of the pile of powder 13 (in the negative direction in the X-axis) having been pushed by the low-rigidity plate-like member 22, and at a position at which the high-rigidity plate-like member 21B does not contact the projecting portion 12 when lowered.

Figure 6:
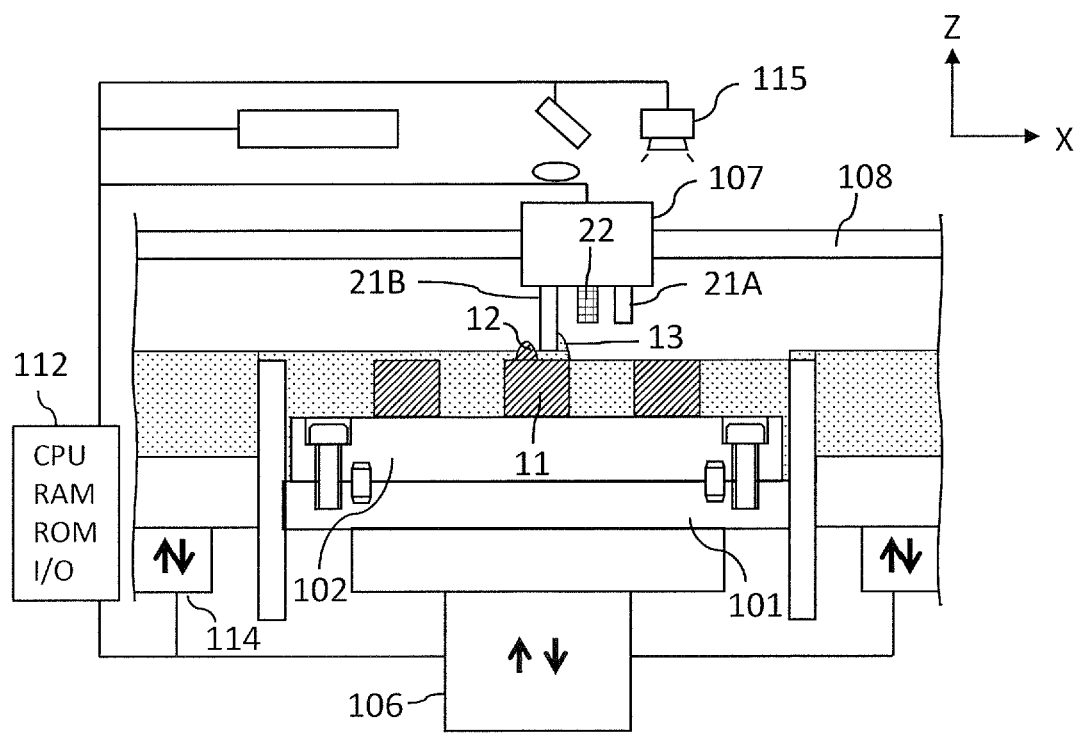
FIG. 6 is a diagram illustrating a state of the powder depositing apparatus in the first embodiment, in which after the low-rigidity plate-like member passes the projecting portion, the low-rigidity plate-like member is retracted upward and a high-rigidity plate-like member is moved to the powder-layer formation height.

Then, as illustrated in FIG. 6, the control unit 112 lowers the high-rigidity plate-like member 21B toward the negative direction in the Z-axis until the height of the lower edge of the high-rigidity plate-like member 21B becomes equal to the height of the deposition-height limiting line 201, and then moves the high-rigidity plate-like member 21B toward the positive direction in the X-axis. Thus, the high-rigidity plate-like member 21B moves in a space above the plate 102 while pushing the pile of powder 13, and thereby forms a layer of material powder having a predetermined thickness for forming the on three-dimensionally shaped objects located in the third to the first rows in FIG. 14.

After the powder layer is formed, the powder layer is irradiated with a laser beam for sintering or melting the material powder, and then the solidifying process is performed for cooling and solidifying the material powder. In the present embodiment, even if a projecting portion is formed on an object located in the fourth row for example, three-dimensionally shaped objects located in all rows can be completed without stopping the additive manufacturing apparatus.

For the present embodiment, the description has been made for the case where a projecting portion is formed at one position. However, even when projecting portions are formed at a plurality of positions, one of the high-rigidity plate-like members is replaced by the low-rigidity plate-like member 22 at a position of each projecting portion, and then the low-rigidity plate-like member 22 spreads the powder layer. In addition, after the low-rigidity plate-like member 22 passes the position of each projecting portion, the layer forming portion replaces the low-rigidity plate-like member 22 with the other of the high-rigidity plate-like members, and causes the other of the high-rigidity plate-like members to spread the powder layer on a remaining area.

If the present invention was not applied, and the high-rigidity plate-like member continued performing the powder-layer forming process at a position of a projecting portion without being replaced with the low-rigidity plate-like member 22, the high-rigidity plate-like member would be caught on the projecting portion and prevented from moving. Otherwise, a product on which the projecting portion is formed and which is being manufactured might be pushed down by the powder-layer forming mechanism. As a result, the product would become an obstacle to the powder-layer forming mechanism, and stop the operation of the manufacturing apparatus, or prevent the powder layer from being uniformly spread even if the manufacturing apparatus does not stop.

Figure 8A:
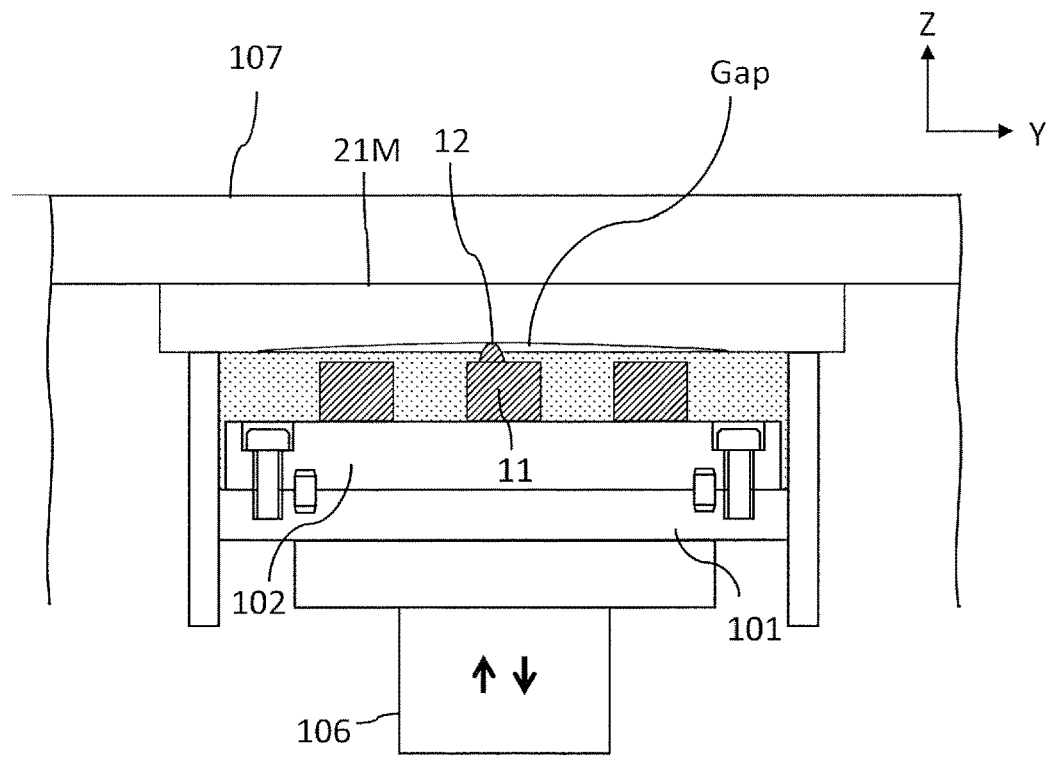
FIG. 8A is a diagram illustrating a state in which a plate-like member is in contact with the projecting portion in a case where the present invention is not applied.

As countermeasures to this, a rigidity of a plate-like member could be reduced so that the plate-like member deforms when contacting a projecting portion. However, if the rigidity is reduced to the extent that the plate-like member deforms in accordance with the shape of the projecting portion, the accuracy in flatness of the powder layer will be lowered in a normal area (in which the projecting portion is not formed) that occupies most of the powder layer, compared to the accuracy obtained when the high-rigidity plate-like member is used. In addition, if a medium-rigidity plate-like member, whose rigidity is slightly smaller than that of the high-rigidity plate-like member, is used, the medium-rigidity plate-like member will not be able to flexibly deform, unlike the low-rigidity plate-like member 22 of the present embodiment, in accordance with the shape of the projecting portion without forming any gap. That is, as illustrated in FIG. 8A, if a medium-rigidity plate-like member 21M whose rigidity is slightly reduced is used, a gap Gap will be formed around the projecting portion 12 that is in contact with the medium-rigidity plate-like member 21M. Thus, the medium-rigidity plate-like member 21M cannot spread the powder layer having a constant thickness, in the whole width in the Y direction without forming any gap.

Figure 8B:
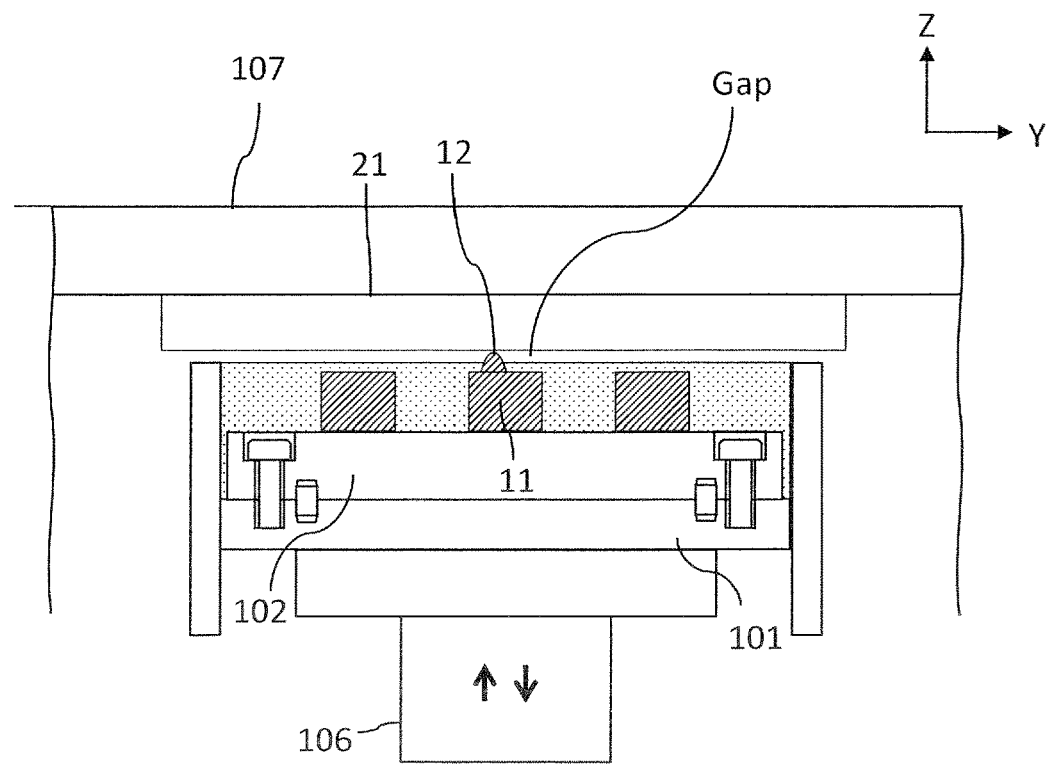
FIG. 8B is a diagram illustrating a state in which a plate-like member is retracted in a case where the present invention is not applied.

In addition, as illustrated in FIG. 8B, if the high-rigidity plate-like member 21 merely moves in the X-axis direction while temporarily retracting so as not to contact the projecting portion 12, a gap Gap will be formed in the whole width in the Y direction. Thus, the high-rigidity plate-like member 21 will move, with a pile of powder being left in the vicinity of the projecting portion 12. As previously described, even if the high-rigidity plate-like member 21 moves downward from a retracting position after passing the projecting portion, the material powder is short at the position to which the high-rigidity plate-like member 21 moves down. As a result, the powder layer will not be formed after that, or otherwise the thickness of the powder layer will become thinner than a predetermined thickness.

Thus, in a case where the present invention is not applied, even if the apparatus can continue to operate when a projecting portion is formed, the apparatus will have trouble in the following formation of the powder layer, and the accuracy in shape of the three-dimensionally shaped object will be lowered.

In the present embodiment, when a plurality of products is formed in parallel in the additive manufacturing, even if a projecting portion is unintentionally formed on part of the products, the additive manufacturing for the products can be reliably continued without stopping the manufacturing apparatus.

In addition, in the present embodiment, when a single product is formed at a time in the additive manufacturing, even if a projecting portion is unintentionally formed on part of the product, the additive manufacturing for the product can be reliably continued without stopping the manufacturing apparatus.

Second Embodiment

Additive Manufacturing Apparatus

Next, a second embodiment of the present invention will be described. The description for a component identical to a component of the first embodiment will be omitted. An overall basic configuration of an additive manufacturing apparatus of the present embodiment is the same as that of the first embodiment, but a configuration and an operation of the powder depositing apparatus 107 is different from those of the first embodiment. In the first embodiment, the high-rigidity plate-like member 21A and the high-rigidity plate-like member 21B are arranged so as to sandwich the low-rigidity plate-like member 22. In the present embodiment, however, the single low-rigidity plate-like member 22 and a single high-rigidity plate-like member 21C are provided. Also in the present embodiment, the low-rigidity plate-like member 22 and the high-rigidity plate-like member 21C can move up and down independently in the Z-axis direction, depending on a command from the control unit 112.

Method of Manufacturing Three-Dimensionally Shaped Object

Since a basic manufacturing operation of the additive manufacturing apparatus of the present embodiment is the same as that of the first embodiment, the detailed description thereof will be omitted. The additive manufacturing apparatus repeats the powder-layer forming process that uses the high-rigidity plate-like member 21C and the solidifying process that irradiates the powder layer with the laser beam; and forms 9 varieties of 49 objects, separated from each other, on the plate 102, as illustrated in the perspective view of FIG. 13 and the plan view of FIG. 14.

Operation Performed when Projecting Portion is Formed

Figure 9A:
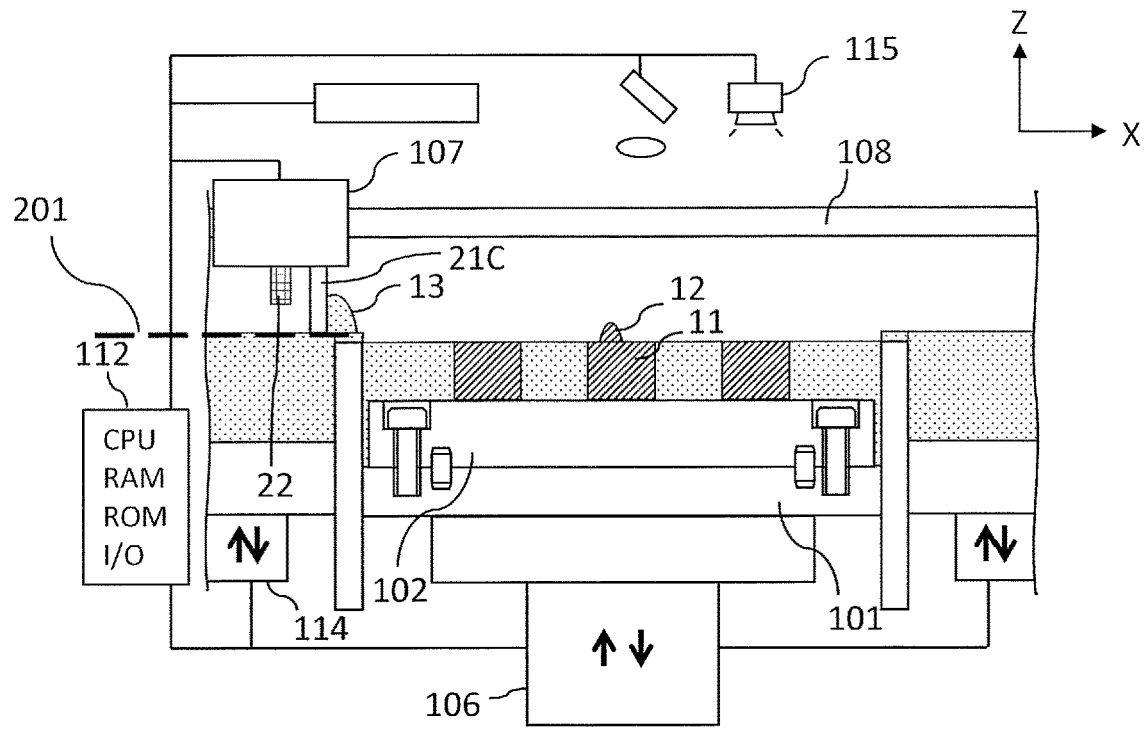
FIG. 9A is a diagram schematically illustrating a state in which a projecting portion is formed in a second embodiment.

Next, an operation of the additive manufacturing apparatus of the second embodiment performed when a projecting portion is unintentionally formed will be described. When a projecting portion that projects from the deposition-height limiting line 201 of FIG. 9A is detected, the control unit 112 performs the powder-layer forming process for the next layer, in a manufacturing operation different from the basic manufacturing operation. The operation of the additive manufacturing apparatus 1 will be described with reference to FIGS. 9A and 9B, FIGS. 10A and 10B, FIGS. 11A and 11B, and FIG. 12. Note that in these figures, part of the three-dimensionally shaped objects formed in seven rows and seven columns is omitted for convenience of illustration.

FIG. 9A schematically illustrates a state in which a projecting portion that projects from the deposition-height limiting line 201 is formed after the powder-depositing process and the laser-beam irradiation process have been repeated several times. FIG. 9A illustrates a solidified portion 11 and an unintentionally formed projecting portion 12. The solidified portion 11 is a three-dimensionally shaped object that is being formed, that is, a portion in which the material powder has been solidified. When the projecting portion 12 is formed, for example, in the formation of a three-dimensionally shaped cylindrical object located at the fourth row and the D-th column in FIG. 14, the control unit 112 obtains the data on the position of the projecting portion 12, that is, the data on the X and Y coordinates of the projecting portion 12, and the data on the height of the projecting portion 12 in the Z-direction, from a result obtained by analyzing an image captured by the monitoring device 115, and stores the data.

Figure 9B:
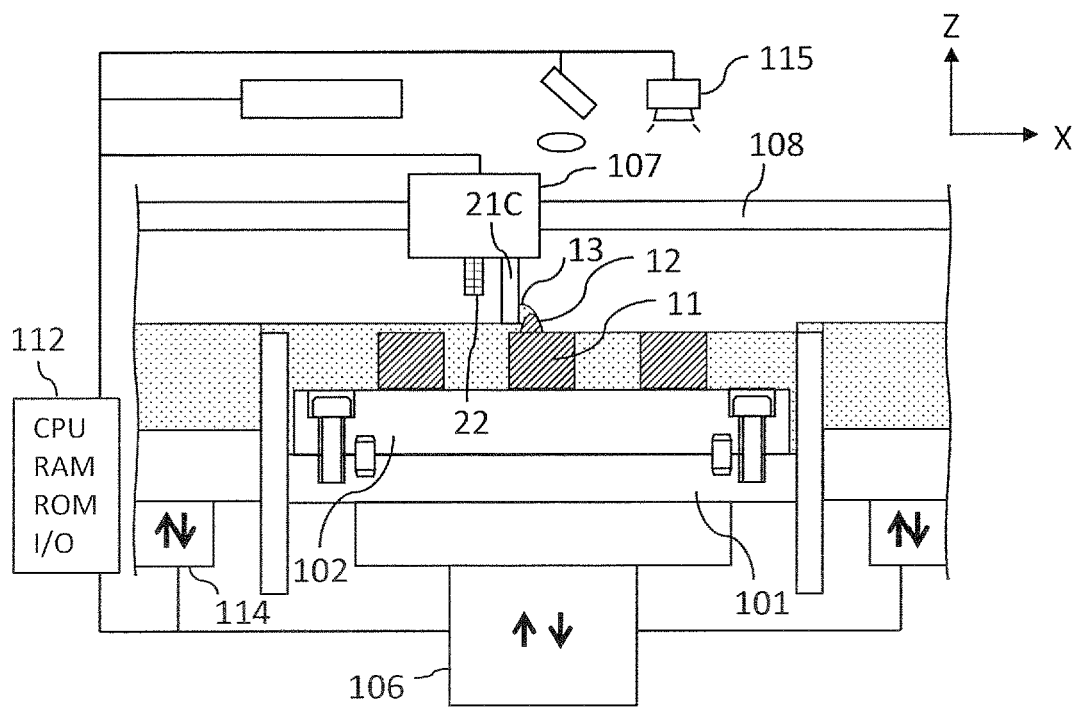
FIG. 9B is a diagram illustrating an operation of a powder depositing apparatus in the second embodiment, in which a high-rigidity plate-like member spreads a powder layer to a position that the high-rigidity plate-like member reaches immediately before reaching the projecting portion.

Then, as illustrated in FIG. 9B, the control unit 112 causes the powder depositing apparatus 107 to move toward the right direction in FIG. 9B (i.e. positive direction in the X-axis) while pushing the pile of powder 13 by using the high-rigidity plate-like member 21C, for spreading the powder layer such that the top surface of the powder layer becomes flat. Since the data on the position of the projecting portion 12 is stored in the control unit 112, the control unit 112 controls the operation of the powder depositing apparatus 107 so that the high-rigidity plate-like member 21C spreads the powder layer to a position that the high-rigidity plate-like member 21C reaches immediately before reaching the projecting portion 12. Thus, in the case where a projecting portion 12 is formed in the three-dimensionally shaped cylindrical object located at the fourth row and the D-th column in FIG. 14, the high-rigidity plate-like member 21C spreads the powder normally on other three-dimensionally shaped objects located in the seventh to the fifth rows, which are located upstream in the moving direction.

Figure 10A:
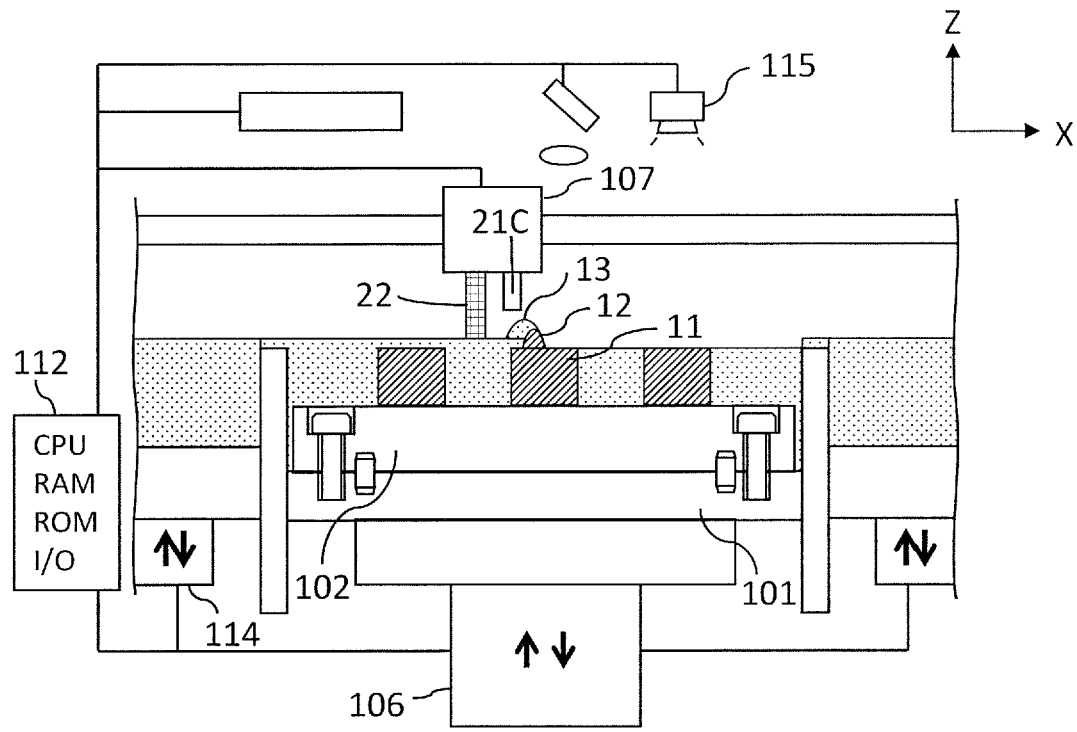
FIG. 10A is a diagram illustrating a state of the powder depositing apparatus in the second embodiment, in which the high-rigidity plate-like member is retracted upward and a low-rigidity plate-like member is moved to a powder-layer formation height.

As illustrated in FIG. 10A, when the high-rigidity plate-like member 21C moves to a position that the high-rigidity plate-like member 21C reaches immediately before reaching the projecting portion 12, the control unit 112 sends a command to the powder depositing apparatus 107 and causes the powder depositing apparatus 107 to move the high-rigidity plate-like member 21C toward the positive direction in the Z-axis, to a height at which the high-rigidity plate-like member 21C does not contact the projecting portion 12. In addition, the control unit 112 causes the powder depositing apparatus 107 to move the low-rigidity plate-like member 22 toward the negative direction in the Z-axis so that the height of the lower edge of the low-rigidity plate-like member 22 becomes equal to the height of the deposition-height limiting line 201.

Figure 10B:
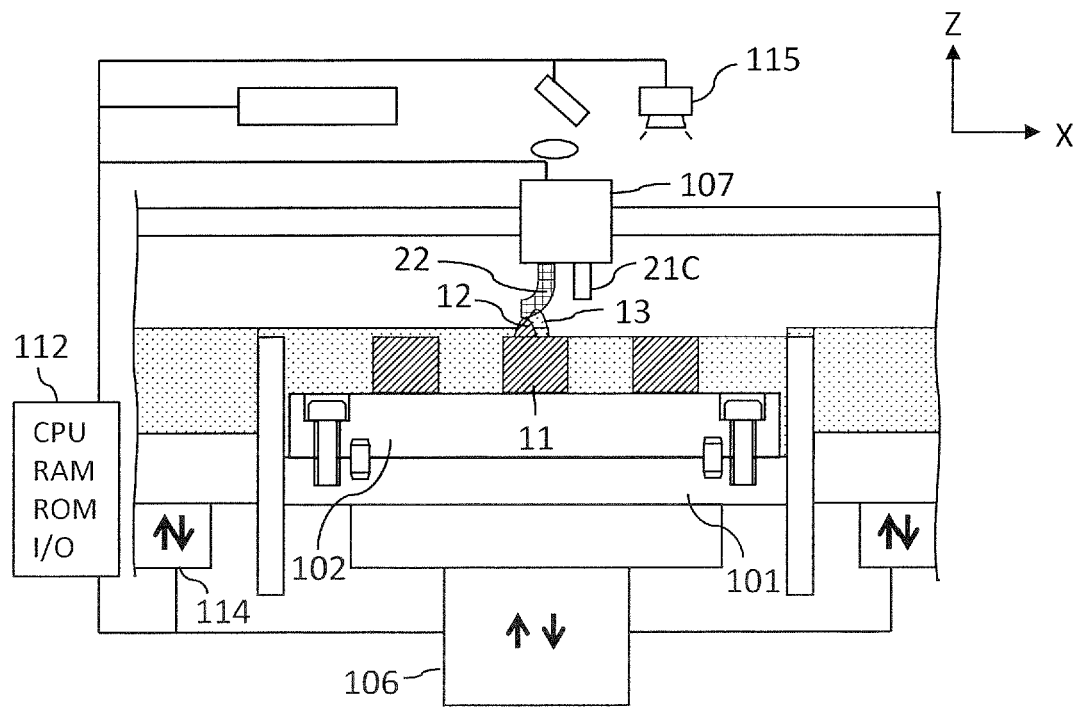
FIG. 10B is a diagram illustrating a state of the powder depositing apparatus in the second embodiment, in which the low-rigidity plate-like member is moving the position of the projecting portion.

Then, as illustrated in FIG. 10B, the control unit 112 causes the powder depositing apparatus 107 to move toward the positive direction in the X-axis. Since the high-rigidity plate-like member 21C passes through a space above the projecting portion 12 without contacting the projecting portion 12, the powder depositing apparatus 107 does not stop, and the high-rigidity plate-like member 22 does not cause the collapse of the three-dimensionally shaped object 11, on which the projecting portion 12 is formed and which is located at the fourth row and the D-th column. In this time, since the low-rigidity plate-like member 22 deforms in accordance with the shape of the projecting portion 12, as illustrated in FIG. 7B, at a position at which the low-rigidity plate-like member 22 contacts the projecting portion 12, the low-rigidity plate-like member 22 can spread the powder in the whole width in the Y direction, without forming any gap. That is, the low-rigidity plate-like member 22 can spread the powder layer having a predetermined thickness not only on the object, which is located at the fourth row and the D-th column and on which the projecting portion 12 is formed, but also on other objects located in the fourth row and in columns other than the D-th column.

Figure 11A:
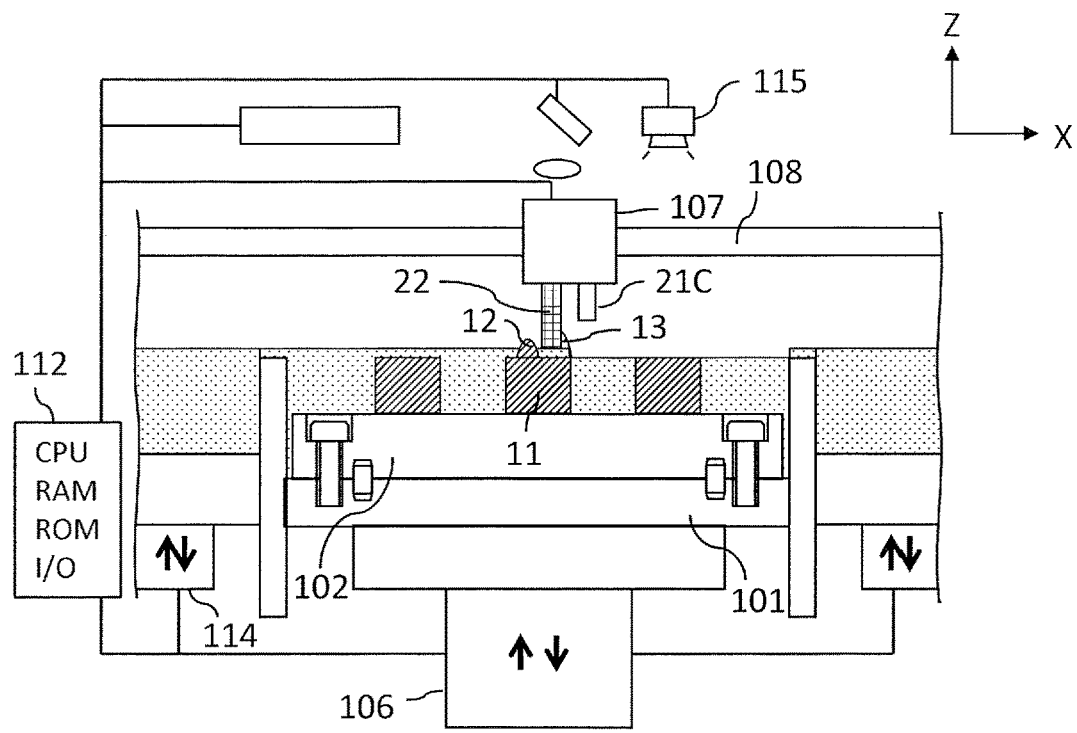
FIG. 11A is a diagram illustrating a state of the powder depositing apparatus in the second embodiment, in which the low-rigidity plate-like member has passed the projecting portion.

As illustrated in FIG. 11A, when the low-rigidity plate-like member 22 moves toward the positive direction in the X-axis, to a position separated from the projecting portion 12, the control unit 112 sends a command to the powder depositing apparatus 107 and causes the powder depositing apparatus 107 to retract the low-rigidity plate-like member 22 toward the positive direction in the Z-axis, to a height at which the low-rigidity plate-like member 22 does not contact the projecting portion 12.

Figure 11B:
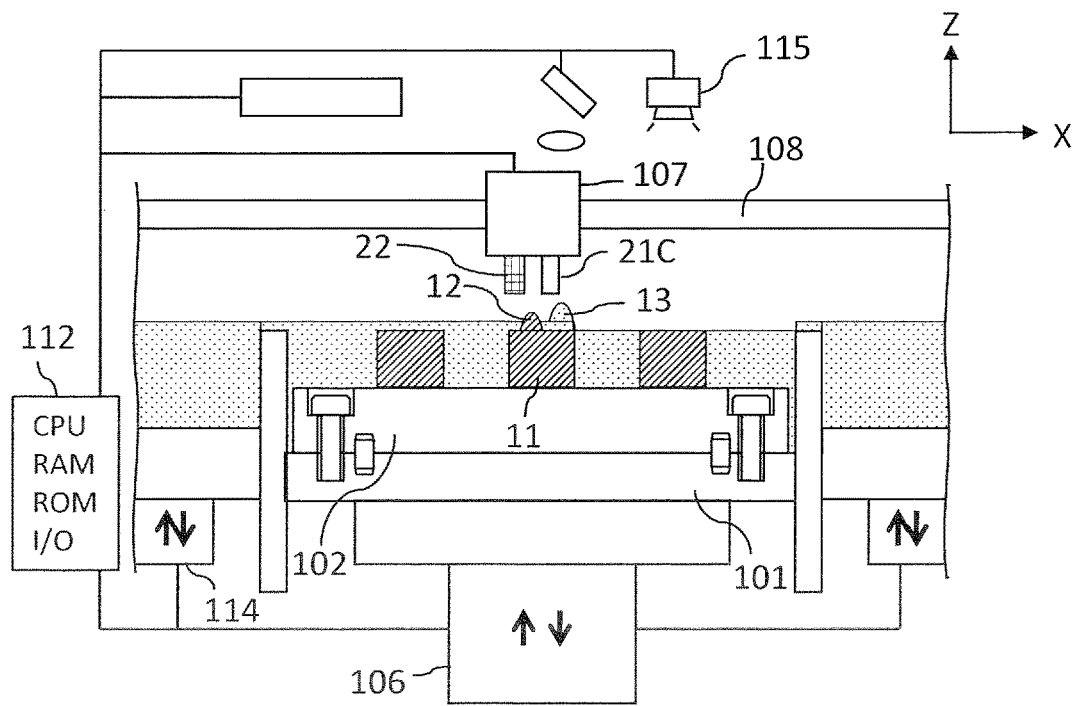
FIG. 11B is a diagram illustrating a state of the powder depositing apparatus in the second embodiment, in which the low-rigidity plate-like member is retracted and the powder depositing apparatus is moved toward a negative direction in an X axis.

Then, as illustrated in FIG. 11B, the control unit 112 causes the powder depositing apparatus 107 to temporarily move toward the negative direction in the X-axis so that the high-rigidity plate-like member 21C is positioned in front of the pile of powder 13 (in the negative direction in the X-axis) having been pushed by the low-rigidity plate-like member 22, and at a position that is not immediately above the projecting portion 12.

Figure 12:
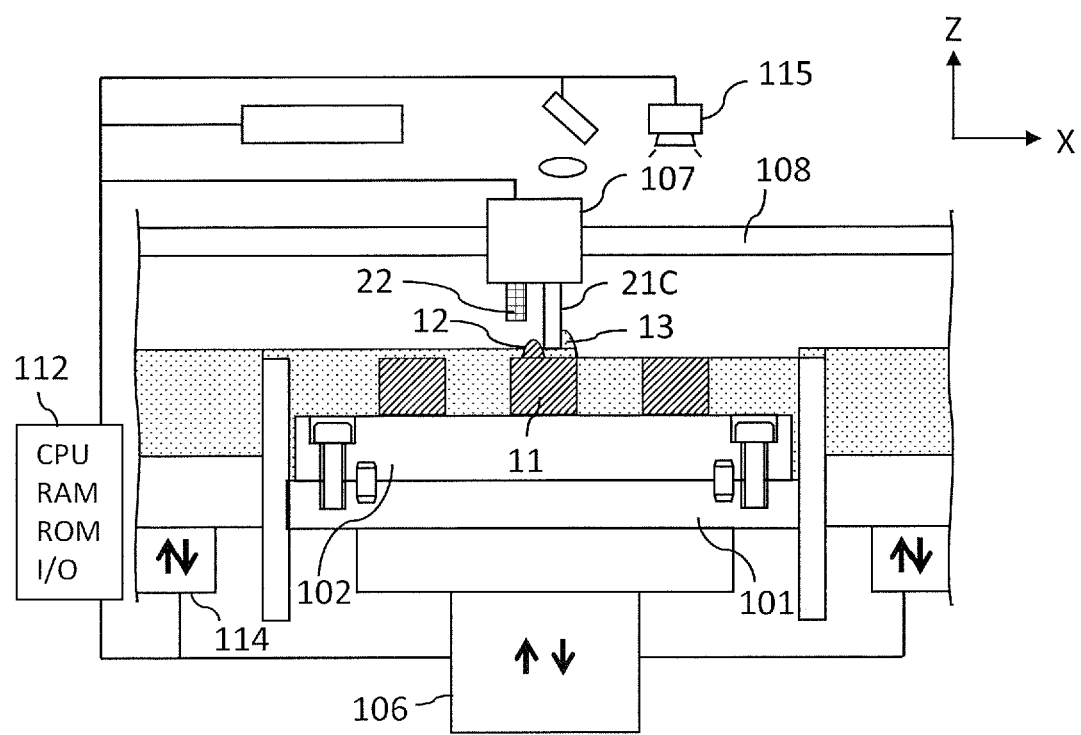
FIG. 12 is a diagram illustrating a state of the powder depositing apparatus in which the high-rigidity plate-like member is moved to the powder-layer formation height to push the pile of powder and form a powder layer.

Then, as illustrated in FIG. 12, the control unit 112 lowers the high-rigidity plate-like member 21C toward the negative direction in the Z-axis until the height of the lower edge of the high-rigidity plate-like member 21C becomes equal to the height of the deposition-height limiting line 201, and then moves the high-rigidity plate-like member 21C toward the positive direction in the X-axis. The high-rigidity plate-like member 21C moves in a space above the plate 102 while pushing the pile of powder 13, and thereby forms a layer of material powder having a predetermined thickness for forming the three-dimensionally shaped objects located in the third to the first rows in FIG. 14.

After the powder layer is formed, the powder layer is irradiated with a laser beam for sintering or melting the material powder, and then the solidifying process is performed for cooling and solidifying the material powder. In the present embodiment, even if a projecting portion is formed on an object located in the fourth row for example, three-dimensionally shaped objects located in all rows can be completed without stopping the additive manufacturing apparatus.

For the present embodiment, the description has been made for the case where a projecting portion is formed at one position. However, even when projecting portions are formed at a plurality of positions, the high-rigidity plate-like member 21C is replaced by the low-rigidity plate-like member 22 at a position of each projecting portion, and then the low-rigidity plate-like member 22 spreads the powder layer. In addition, after the low-rigidity plate-like member 22 passes the position of each projecting portion, the layer forming portion 107 replaces the low-rigidity plate-like member 22 with the high-rigidity plate-like member 21C, and causes the high-rigidity plate-like member 21C to spread the powder layer on a remaining area.

If the present invention was not applied, and the high-rigidity plate-like member 21C continued performing the powder-layer forming process at the position of a projecting portion without being replaced with the low-rigidity plate-like member 22, the high-rigidity plate-like member 21C would be caught on the projecting portion and prevented from moving. Otherwise, a product on which the projecting portion is formed and which is being manufactured might be pushed down by the powder-layer forming mechanism. As a result, the product would become an obstacle to the powder-layer forming mechanism, and stop the operation of the manufacturing apparatus, or otherwise prevent the powder layer from being uniformly spread.

As countermeasures to this, a rigidity of a plate-like member could be reduced so that the plate-like member deforms when contacting a projecting portion. However, if the rigidity is reduced to the extent that the plate-like member deforms in accordance with the shape of the projecting portion, the accuracy in flatness of the powder layer will be lowered in a normal area (in which the projecting portion is not formed) that occupies most of the powder layer, compared to the accuracy obtained when the high-rigidity plate-like member is used. In addition, if the medium-rigidity plate-like member, whose rigidity is slightly smaller than that of the high-rigidity plate-like member, is used, the medium-rigidity plate-like member will not be able to flexibly deform, unlike the low-rigidity plate-like member 22 of the present embodiment, in accordance with the shape of the projecting portion without forming any gap. That is, as illustrated in FIG. 8A, if a medium-rigidity plate-like member 21M whose rigidity is slightly reduced is used, a gap Gap will be formed around the projecting portion 12 that is in contact with the medium-rigidity plate-like member 21M. Thus, the medium-rigidity plate-like member 21M cannot spread the powder layer having a constant thickness, in the whole width in the Y direction without forming any gap.

In addition, as illustrated in FIG. 8B, if the high-rigidity plate-like member 21 merely moves in the X-axis direction while temporarily retracting so as not to contact the projecting portion 12, a gap Gap will be formed in the whole width in the Y direction. Thus, the high-rigidity plate-like member 21 will move, with a pile of powder being left in the vicinity of the projecting portion 12. Even if the high-rigidity plate-like member 21 moves downward from a retracting position after passing the projecting portion, the material powder is short at the position to which the high-rigidity plate-like member 21 moves down. As a result, the powder layer will not be formed after that, or otherwise the thickness of the powder layer will become thinner than a predetermined thickness.

Thus, in a case where the present invention is not applied, even if the apparatus can continue to operate when a projecting portion is formed, the apparatus will have trouble in the following formation of the powder layer, and the accuracy in shape of the three-dimensionally shaped object will be lowered.

In the present embodiment, when a plurality of products is formed in parallel in the additive manufacturing, even if a projecting portion is unintentionally formed on part of the products, the additive manufacturing for the products can be reliably continued without stopping the manufacturing apparatus.

In addition, in the present embodiment, when a single product is formed at a time in the additive manufacturing, even if a projecting portion is unintentionally formed on part of the product, the additive manufacturing for the product can be reliably continued without stopping the manufacturing apparatus.

Since the single high-rigidity plate-like member 21C is used in the present embodiment, the present embodiment can downsize and lighten the powder depositing apparatus 107, compared to the first embodiment.

EXAMPLES

Next, specific examples and comparative examples will be described. Example 1 to Example 4 are specific examples of the above-described embodiments. Comparative Example 1 is an example in which the manufacturing was performed using an additive manufacturing apparatus having only a high-rigidity plate-like member. Comparative Example 2 is an example in which the manufacturing was performed using an additive manufacturing apparatus having only a low-rigidity plate-like member.

Additive manufacturing processes of the examples and the comparative examples were performed in the following conditions. In Example 1 to Example 4, the material powder used was SUS630 or AlSi10Mg having a maximum particle diameter of 35 µm or less and an average particle diameter of 20 µm. In Comparative Example 1 and Comparative Example 2, the same material powder as that for Example 1 to Example 3 was used for performing the manufacturing. The light source used was a fiber laser, and the atmosphere used in the manufacturing was argon gas having a temperature of 30° C. and an oxygen concentration of 1000 ppm.

The manufactured three-dimensionally shaped objects were blocks used as a component for a mechanical apparatus and having a size of 100 mm×100 mm×40 mm. The three-dimensionally shaped objects were manufactured under the same condition, that is, in the single-product manufacturing, in the examples and the comparative examples. In the manufacturing, the laser beam had higher energy than that used for a heating process in ordinary additive manufacturing. Thus, when irradiated with the laser beam, the powder melted faster, resulting in a high-density object with low porosity.

In the examples and the comparative examples, the manufactured objects were evaluated on two evaluation items: manufacturability and quality of manufactured object.

In the manufacturability, when a projecting portion was formed during a manufacturing process, there was evaluated whether the apparatus was abnormally stopped by the overload caused by collision between the projecting portion and a plate-like member and applied to the apparatus, or whether the apparatus was abnormally stopped by the collapse of the object and the interference between the object and the apparatus. When the manufacturing process was normally completed, an evaluation result "A" was given. When the apparatus was abnormally stopped, an evaluation result "B" was given.

In the quality of manufactured object, when a projecting portion was formed during the manufacturing process, the completed object was visually checked for determining whether a crack, a step, or a projection was formed due to a defective powder layer. Then, an evaluation result "A" was given if the external appearance was acceptable, and an evaluation result "B" was given if any crack, step, or projection was identified.

Table 1 collectively tabulates materials of plate-like members, materials of the powder, and evaluation results.

collided with the projecting portion and stopped, or the object collapsed. Even if the apparatus did not stop when the object collapsed, the object having collapsed interfered with the apparatus and prevented the normal formation of the powder layer. Thus, the accuracy in shape of the completed object was unacceptable.

In Comparative Example 2, when a projecting portion was formed on part of an object during the manufacturing of the object, the manufacturing process was completed. However, since the whole of the completed object was formed by using the low-rigidity plate-like member, the shape of the object was defective due to insufficient accuracy in flatness and thickness of the powder layer. Thus, the accuracy in shape of the three-dimensionally shaped object was unacceptable.

Modifications

The present invention is not limited to the above-described embodiments and examples, and can be modified within the technical spirit of the present invention.

For example, although the laser light source is used in the above-described embodiments as a light source to heat the material powder layer having been spread, light other than the laser beam may be used as long as the irradiation energy density of the light can be controlled and the light can be used for scanning and irradiating the material powder layer. For example, an irradiation optical system in which optical components, such as a high-intensity lamp, a shutter, a variable focusing lens, and a scan mirror, are combined may be used for some cases. In addition, the heating energy beam may not be the light beam but an electron beam.

In addition, the material powder may not be the metal powder but resin powder made of resin such as ABS, PEEK, or the like. Furthermore, the particle diameter of the material powder is not limited to those of the above-described embodiments and examples.

TABLE 1

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| MATERIAL OF HIGH-RIGIDITY PLATE-LIKE MEMBER | SKD11 | TUNGSTEN CARBIDE | SKD11 | SKD11 | SKD11 | — |
| MATERIAL OF LOW-RIGIDITY PLATE-LIKE MEMBER | SILICONE RUBBER | SILICONE RUBBER | ELASTOMER | SILICONE RUBBER | — | SILICONE RUBBER |
| MATERIAL OF POWDER | SUS630 | SUS630 | SUS630 | AlSi10 | SUS630 | SUS630 |
| MANUFACTURABILITY | A | A | A | A | B | A |
| QUALITY OF MANUFACTURED OBJECT | A | A | A | A | B | B |

As illustrated in Table 1, all the examples were not given the evaluation result "B", which will cause trouble in practical use. That is, in Example 1 to Example 4, when a projecting portion was formed on part of an object during the manufacturing of the object, the manufacturing process was normally completed, and the quality of the completed object was acceptable.

In contrast, in Comparative Example 1, when a projecting portion was formed on an object during the manufacturing of the object, the apparatus stopped and failed to complete the object in most cases, because a plate-like member Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-26964, filed Feb. 18, 2019, which is hereby incorporated by reference herein in its entirety.

What is claimed is:

1. An additive manufacturing apparatus comprising:
a base;
a layer forming portion configured to form a powder layer having a predetermined thickness by moving in a space above the base;
an irradiation portion configured to irradiate the powder layer with an energy beam;
a detection portion configured to detect a projecting portion formed on a solidified portion and a position of the projecting portion, the solidified portion being formed by irradiating the powder layer with the energy beam from the irradiation portion, a height of the projecting portion being larger than the predetermined thickness; and
a control unit,
wherein the layer forming portion comprises a high-rigidity thickness-determining portion and a low-rigidity thickness-determining portion, and
wherein the control unit is configured to control operation of the high-rigidity thickness-determining portion and the low-rigidity thickness-determining portion, depending on a detection result by the detection portion.

2. The apparatus according to claim 1, wherein the control unit is configured to repeat a powder-layer forming operation, a solidifying operation, and a check operation in this order,
wherein in the powder-layer forming operation, the control unit causes the layer forming portion to move in the space above the base and form the powder layer having the predetermined thickness,
wherein in the solidifying operation, the control unit causes the irradiation portion to irradiate the powder layer with the energy beam in accordance with a shape of a product to be formed and form the solidified portion,
wherein in the check operation, the control unit causes the detection portion to check the solidified portion formed in the solidifying operation, and
wherein if the projecting portion having the height larger than the predetermined thickness is detected in the check operation, the control unit controls the layer forming portion in the powder-layer forming operation to be performed next, such that:
until reaching a position located in front of the projecting portion, the high-rigidity thickness-determining portion moves while forming a next powder layer,
at a position of the projecting portion, the low-rigidity thickness-determining portion moves while forming the next powder layer, and
after passing the position of the projecting portion, the high-rigidity thickness-determining portion moves while forming the next powder layer.

3. The apparatus according to claim 2, wherein if the projecting portion having the height larger than the predetermined thickness is detected in the check operation, the control unit controls the layer forming portion in the powder-layer forming operation to be performed next, such that
at the position of the projecting portion, the high-rigidity thickness-determining portion retracts to a position at which the high-rigidity thickness-determining portion does not contact the projecting portion.

4. The apparatus according to claim 2, wherein if the projecting portion having the height larger than the predetermined thickness is not detected in the check operation, the control unit controls the layer forming portion in the powder-layer forming operation to be performed following the check operation in which the projecting portion has not been detected, such that the layer forming portion uses only the high-rigidity thickness-determining portion for forming a next powder layer.

5. The apparatus according to claim 2, wherein the high-rigidity thickness-determining portion comprises a plurality of high-rigidity thickness-determining members,
wherein if the projecting portion having the height larger than the predetermined thickness is detected in the check operation, the control unit controls the layer forming portion in the powder-layer forming operation to be performed following the check operation in which the projecting portion has been detected, such that
until reaching the position located in front of the projecting portion, the layer forming portion uses a first high-rigidity thickness-determining member of the plurality of high-rigidity thickness determining members, and
after passing the position of the projecting portion, the layer forming portion uses a second high-rigidity thickness-determining member of the plurality of high-rigidity thickness-determining members.

6. The apparatus according to claim 1, wherein the high-rigidity thickness-determining portion comprises a plate-shaped member or a roller,
wherein the plate-shaped member or the roller of the high-rigidity thickness-determining portion is made of a high-rigidity material,
wherein the low-rigidity thickness determining portion comprises a plate-shaped member or a roller, and
wherein the plate-shaped member or the roller of the low-rigidity thickness-determining portion is made of a low-rigidity material whose rigidity is smaller than a rigidity of the high-rigidity material.

7. A non-transitory computer-readable storage medium in which a program is stored, wherein the program causes the control unit of the additive manufacturing apparatus according to claim 2, to execute the powder-layer forming operation, the solidifying operation, and the check operation.

\* \* \* \* \*